Sept. 10, 1968 G. H. BARNES ET AL 3,401,376

CENTRAL PROCESSOR

Filed Nov. 26, 1965 12 Sheets-Sheet 1

INVENTORS.
GEORGE H. BARNES
RICHARD E. BRADLEY
SIMON E. GLUCK
ALBERT SANKIN
JOSEPH SHIFMAN
RICHARD A. STOKES

Joseph P. Kates
ATTORNEY

Sept. 10, 1968 G. H. BARNES ET AL 3,401,376

CENTRAL PROCESSOR

Filed Nov. 26, 1965 12 Sheets-Sheet 2

Sept. 10, 1968 G. H. BARNES ET AL 3,401,376

CENTRAL PROCESSOR

Filed Nov. 26, 1965 12 Sheets-Sheet 3

INVENTORS.
GEORGE H. BARNES
RICHARD E. BRADLEY
SIMON E. GLUCK
ALBERT SANKIN
JOSEPH SHIFMAN
RICHARD A. STOKES

Joseph P. Kates
ATTORNEY

ONE-SYLLABLE INSTRUCTIONS

TWO-SYLLABLE INSTRUCTIONS

ADDRESS-BEARING INSTRUCTIONS (4 SYLLABLE)

FIELD INSTRUCTIONS

THREE-SYLLABLE INSTRUCTIONS

CENTRAL PROCESSOR

JUMP (SPECIAL CASE OF TWO-SYLLABLE INSTRUCTIONS)

JUMP ON FIELD TEST

JUMP ON INDEX TEST

SET UP JUMP INSTRUCTIONS

Sept. 10, 1968 G. H. BARNES ET AL 3,401,376

CENTRAL PROCESSOR

Filed Nov. 26, 1965 12 Sheets-Sheet 9

CENTRAL PROCESSOR

United States Patent Office 3,401,376
Patented Sept. 10, 1968

3,401,376
CENTRAL PROCESSOR
George H. Barnes, West Chester, Richard E. Bradley, Wayne, Simon E. Gluck, Malvern, Albert Sankin, King of Prussia, Joseph Shifman, Villanova, and Richard A. Stokes, West Chester, Pa., assignors to Burroughs Corporation, Detroit, Mich., a corporation of Michigan
Filed Nov. 26, 1965, Ser. No. 509,908
39 Claims. (Cl. 340—172.5)

ABSTRACT OF THE DISCLOSURE

A new central processor module for a modular data processor system is disclosed. Among other features, it has an advanced look-ahead system which is capable of selectively performing only that future work which will be used. Thus it does not perform advanced computations which will become unnecessary due to an unforeseen branching of the program. Nor does it perform work which must later be undone in order to return the program to an earlier condition. The disclosed central processor also possesses the ability to concurrently perform a plurality of program segments. It accomplishes this by having a plurality of units which are capable of substantially independent operation. The processor also possesses structure for providing alternate memory bounds. In addition, the processor includes functionally separate scratch pad memories and controls plus an associative memory which cooperates therewith. Still further, the processor automatically effects indirect jumps and it has a variable length local stack extension plus the capability of extending the stack memory into the main memory.

The present invention relates to a data processor system which may be incorporated as a portion of a large scale modular computer system. More particularly, the present invention relates to a data processor module or unit which is capable of being used with a modular data processing system which may have a plurality of data processing or computer modules, a plurality of input-output control modules, associated peripheral units which communicate with the input-output control modules and a plurality of memory modules which are associated with the data processor module and with the input-output control modules. Communication means which may comprise communication buses, for example, in a switch interlock means which may be a separate unit or partially or wholly distributed among the modules, may serve as the communication medium between the data processor modules of the present invention, the memory modules associated with the system in which it is designed to be interfitted and the input-output control modules. Additionally, an I/O exchange unit which, for example, may be very similar to the switch interlock, may be disposed between the peripheral units and the I/O control modules.

The terms "modules" and "units" as used herein are synonomous in meaning and defined by applicants as independent functional entities. The invention is not to be limited to fixed mechanical boundaries to the modules, and there is no physical restriction implied such that the modules may not incorporate smaller modules or units or portions thereof which relate to functions other than those designated by the name of the module or unit. The terms processor, computer, processor module, computer module and central processor will be used as alternative equivalent names to designate the system of this invention. The term input-output is abbreviated throughout this application as I/O.

In the system which includes the present inventive system, the central processors, the I/O control modules and the memory modules may each be capable of executing commands which may be called descriptors. Alternatively, only one or two types may be made capable of executing descriptors. These descriptors initiate a train of operations. For example, an input-output control unit descriptor might comprise a command the execution of which effects fetching a block of data from one of the peripheral devices and placing the block into contiguous locations in memory. Similarly, in this system it is contemplated in one preferred embodiment that the memory module itself may execute a descriptor which might be of the type, for example, which would call for scanning a block of data within the memory module to see whether the words therein fit required characteristics as specified by the data processor (module) of the invention. In a second preferred embodiment the memory modules or units are not provided with the capability of initiating or executing their own descriptors. The data processor itself operates under program control. The system is tied together with an executive program of the type, for example, which is described in co-pending application Ser. No. 246,855 of Anderson et al., filed Nov. 30, 1962 for "Modular Computer System," and the background teachings of that patent are hereby incorporated by reference into this application. The descriptors used in the system of which the computer of this invention may form a unit may comprise, for example, 52-bit words which contain various fields. I/O descriptors (input-output control modules) are provided in the system also for channel word operations and special program steps concerned with operation of the I/O control modules. These are more fully described and illustrated in co-pending application Ser. No. 509,909 filed Nov. 26, 1965, of Richard E. Bradley, Albert Sankin, George H. Barnes, S. Peter Beauregard, James L. Murtaugh and Herbert L. Rosenblatt, for "Modular Input/Output Data Service Processor," and assigned to the assignee of this application. Reference is made to that application which is hereby incorporated by reference into the present application. Incorporated by reference herein is also co-pending application Ser. No. 509,719, also filed Nov. 26, 1965, of John T. Lynch, Walter Fresch, Blair C. Thompson and Richard E. Bradley, for "A Modular Multicomputing Data Processing System" which describes the system of which the present invention may form a subsystem. The various types of descriptors and their nomenclature which are especially applicable to the I/O control module are also reviewed briefly hereinbelow to conveniently aid in the understanding of the present central processor system.

It should be understood that the computer or central processor modules of this invention are not required to perform certain operations involving transferring information and loading it into memory from external units. These functions are performed by the above-described I/O control module of the system of which this invention may form the computer or data processor portion. Additionally, in this system the computer will seldom have to take over the function of directing the I/O control module to perform sequential assignments of tasks to itself. The I/O control module(s) normally reassigns itself (themselves) continuously by means of link descriptors which will be referred to further hereinbelow. Additionally, the I/O control module may be channeled such that each individual one or each group of input and output units is handled by a separate channel of I/O control, and in the latter case the requirement may be dispensed with for governing the selection of which I/O unit will be required to effect transfers. Channel words are provided, each of which relates to one of the channels of communication between I/O devices and I/O control modules. In one preferred system embodiments 512 such channels are provided, and one or two channels and their channel words (which will be described) are individually assigned to respective input and output or peripheral devices. Additionally, the memory itself in one embodiment of the system may have a number of program steps which are written in a language which is interpreted only by the I/O control unit or module and not by the computer and which steps are not designed to be exercised by the computer, but by the I/O control module, which latter is designed to execute them. These program steps involve such procedures and information as testing, specifying the number of words to be transferred and to or from which peripheral unit, and initiating transfers on other I/O channels within the same input-output control device. Contained in the memory module are a group of parameters which permit individualization of a program string which comprises a set of the program steps.

Also contained in the memory is a parameter area associated with each channel word. The logic behind the parameter area is so that the parameters can be separated. The parameters comprise information concerning the internal operations such as how many words are to be transferred, the memory address to which the words are to be transferred, the I/O channel which is to be activated upon completion of transfer, etc. It is thus possible to have several I/O channels running the same I/O program steps in several different parameter areas. This permits, for example, that many similar devices such as many card readers can be executing the same I/O program steps and yet keep the data separate and the operations separate by means of the separation in the base parameter area.

Thus, the series of program steps are actually a series of routines which involve any I/O control operation, and the separate portion in memory contains a listing of the specific numbers of things and items for identification which are to be loaded, transferred, or on which some other input-output control operation is to be effected. This permits the I/O control modules to perform the function of transfers with program and data being separated such that necessity for repetition of routines is avoided.

A third area in memory is common to all the channels. It is the area in which the results of channel operations are inserted. These results are inserted whenever the program step of the individual channel program calls for the insertion of the results. This area is defined by a base address register which is common to the whole I/O control module and which is set under executive program control.

The illustrative embodiment I/O control module of the system with which the central processor of the invention is adapted to be a portion is organized around a storage which may be contained in the I/O control module. The main feature of the storage is an area per channel which contains approximately one hundred and four (104) bits of control information and one or more additional words, for example, one word, of data area.

Prior art modular computer systems and computer modules for such systems have been known. These comprise, for example, systems marketed by the Burroughs Corporation, the assignee of the present invention, and known as the Burroughs B 5000, the Burroughs D-825 and the Burroughs B 5500 systems. These systems are described in copyrighted or other published manuals of the Burroughs Corporation, for example, the manual, Burroughs Militarized Modular Data Processing System, available on request from Burroughs Corporation, Paoli, Pa., and the manual entitled Burroughs B 5500, Information Processing Systems, Reference Manual, copyrighted 1964, Burroughs Corporation, Detroit, Mich. The contents of these manuals are incorporated by reference into this application as are the teachings of these named Burroughs Corporation computer systems. Also incorporated by reference into this application are patent application Ser. No. 89,525 of Hopper et al. for Computer System, filed Feb. 15, 1961; application Ser. No. 241,273 of Mott et al., for Computer, filed Nov. 30, 1962; patent application Ser. No. 246,855 of Anderson et al., filed Nov. 30, 1962, for Modular Computer System; and U.S. Patent No. 3,200,380 of MacDonald et al., for Data Processing System, issued Aug. 10, 1965; all assigned to the assignee of the present invention.

The present system adopts and improves upon some of the principles of these second generation computer systems. The system of the present invention incorporates also special circuitry, special features which enable such functions as a vastly improved look-ahead system provided by its processor system virtual autonomy of each of the modules of the overall system, and a dynamic memory bounds mechanism for protection of individual programs. The computer module or data processor module of the present invention is designed to operate with a master scheduling program and control system such that improved cooperation of the various modules of the system, and particularly improved operation of the computer module, may result with fewer interruptions to the system. Many less operations and roundabout procedures will be required to perform the computer functions because of the structure and operation of the inventive computer module. The Central Processor of the invention incorporates several advantageous structures and features of important significance to the art. For example, in the processor system of the invention the instruction look-ahead addresses are fed to an advast station wherein processing of the instruction occurs and previously are sent to an instruction look-ahead station so that if a branch will occur no retracing of unnecessary or undesirable steps will have had to be effected because the advast unit is started. That is, look-ahead to see if a branch is to occur will be effected before any processing within the computer takes place, and the branch is decided before any steps or manipulating of the data are allowed to ensue.

In the present invention an associative memory is provided which specifically and in an improved manner improves operation in conjunction with a program reference table such that the hardware helps the executive program in being able to supervise and schedule multitask and multiprogram operations.

Additionally, because of the feature of the division of computer module functions and the provision of individual units for each divided function which applicants term instruction processor units, such as syllable determination, advast, and final station and their operating in parallel instead of one at a time in sequence, speed up and maximum efficiency of utilization of each of the units of the computer is effected, without adding programming complexity.

Thus, the present inventive computer module effects advantages by its parallel processing such that the programmer need not be concerned with the details of operation within the machine. This is an advantage even over machines the conception of which was published later than applicants' present invention such as the computer system which is reportedly being designed and contemplated design of which is described in the AFIPS Conference Proceedings, vol. 26, part II, 1964 Fall Joint Computer Conference, Very High-Speed Computer Systems, sponsored by the Association for Computing Machinery, etc., © 1965 by the American Federation of Information Processing Societies, 211 E. 43rd St., New York, 10017, Sparton Books, Inc., 1106 Connecticut Ave., N.W., Washington, D.C., pages 33-68.

More specifically stated, another advantage of the present invention is that it provides a computer or processor in which a plurality of very fast auxiliary memories are provided within the computer module per se and which auxiliary memories perform different functions simultaneously, for example, performing processing of instructions in one of the very fast auxiliary memory sections and at the same time performing processing of data in another very fast auxiliary memory incorporated in the processor. In this invention simultaneously and in divided functional relationship, individual fast acting auxiliary scratch-pad memories are being utilized for instruction look-ahead, local data buffering, an associated local register, temporary queuing before an advanced station and a final station, a separate stack auxiliary memory and a separate associative memory. The inventive system is so constructed that each of these is susceptible of being built as very fast acting units such as integrated circuits and/or optionally as tunnel diodes circuits and/or thin-film memories. Another advantage of the present invention is that it provides a computer unit capable of performing its operations very rapidly, for example, within periods which may be as low as 100 nanoseconds, for some operations and which computer is capable of operating at very high frequencies, for example, in the order of 30 megacycles, although higher and lower frequencies are also contemplated and within the scope of the invention, for example, 20 or 10 megacycles.

Accordingly, an object of the present invention is to provide a central processor computer module for a system wherein there is facilitated the cooperation of computer hardware with an executive program for the efficient achievement of multiprogramming and simultaneous multitask operations.

Another object of the present invention is to provide a computer module which is capaable of efficiently performing multitastk operation within the same computer module.

Still another object of this invention is to provide a central processor module so structured as to lend itself to efficient compiling and execution of compiled programs under supervision of an executive program.

Another obect of the invention is to provide a computer or central processor module which achieves increased computational throughput by means of look-ahead features without the inefficiencies and waste motions which have been produced by so-called look-ahead features of prior art.

Another object of the present invention is to provide a computer module which possesses true look-ahead features in that although parallel processing of a present and anticipated command is being effected, no command is presently executed in a final station until it is ascertained that the future commands in a look-ahead station will not have a branching or other occurrence which would render the processing or execution of the present commands detrimental or unnecessary.

A further object of the present invention is to provide a machine which is capable of performing a look-ahead feature in such manner that only those anticipated instructions are executed which are in fact to be carried out in the future, the machine being equipped with provisions for anticipating a plurality of commannds in advance such that it is determined before execution of a command or step is to take place that a branching or transfer will not be effected which would make the command or step not proper to be executed.

Another object of the present invention is to provide a computer module which is adaptable to multiprogramming and multiprocessing to enable the execution of a program which itself is divided into logical segments of instructions and constants, a program reference table which affords the linking between program and data segments which may be allocated separately, and which further may call upon a working memory area which working memory area is composed of an operand stack and extension, a subroutine control stack which is pointed to by a base index register, and a global data area which contains variables accessible by all subroutines.

A still further object of the present invention is to provide a processor which will enhance effecting jumps for transfers and wherein transfer instructions may be referenced to any syllable within a word, wherein a syllable is a definite number of bits long and a plurality of syllables form a word.

Another object of the present invention is to provide a computer module which has flexible and relatively foolproof memory bounds protection and particularly wherein improper access to segments of data is precluded, and wherein the program is prohibited from destroying any data other than its own by a system of memory bounds registers and a program reference table protecting mechanism.

Another object of the present invention is to provide a computer module which has memory bounds protection such that all stores to prohibited areas result in the program being interrupted and virtually all fetches from meaningless areas also cause an interrupt.

Still another object of the present invention is to provide a computer which is capable of utilizing program descriptors contained in common program reference table to effect transfers between segments of the program and wherein the computer implements the capability of the program descriptors to cause addressing of any syllable in the segment.

A further object of the present invention is to provide a central processor for a data processing system which processor may be operated with a working memory comprising three logical segments, an operand stack, a common program reference table, and a subroutine control stack allocated in a contiguous memory block and bounded by processor memory bounds wherein the operand stack is utilized for all arithmetic and logic operations and for holding temporary results, a common data area which is relatively addressed and wherein the subroutine control stack provides dynamically allocated space for subroutines and procedures and also contains local variables, index words and parameters.

Another object of the present invention is to provide a processor which has instruction executing circuitry and also look-ahead features such that many of the instructions which are fed into the look-ahead stage but which are not required to be processed in the execution control portion are translated logically in such manner as to save considerable circuitry.

Still an additional aim of the invention is to provide a processor wherein are provided an instruction look-ahead station, an advanced station, a final queue, and a final station wherein instruction look-ahead is separated from the station to allow the advanced station to run more efficiently by structuring such that the advanced station is not permitted to perform any work which must be undone, the advanced station upon sensing a jump instruction does not execute any instructions other than fetching of program words until it knows whether a jump is to be taken or not and which way the jump is to be taken, and which processor of the present invention thereby is advantageous over other processors which process all instructions through a final station and have to straighten this out when jumps occur, the disadvantageous other systems which lack the incorporation of the present invention thus being prone to situations which cause slowdown.

This invention, together with further objects and advantages thereof, will be apparent upon reference to the following detailed description of preferred embodiments thereof, with attendant reference to the accompanying drawings being made, and its scope will be pointed out in the appended claims. In the drawings:

Figure 1:
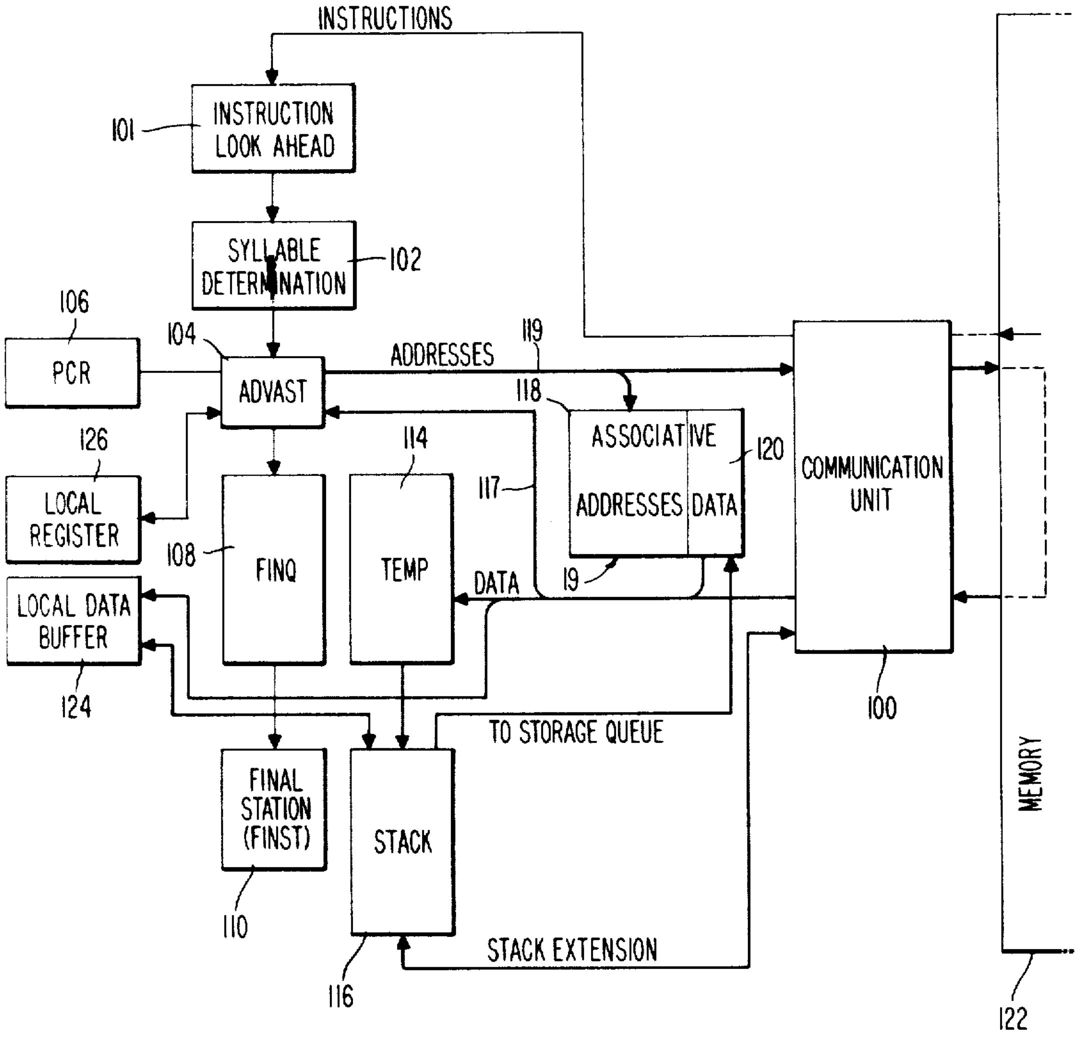
FIG. 1 is a schematic block diagram representative of a first preferred illustrative embodiment of the processor system of the present invention.
Figure 7:
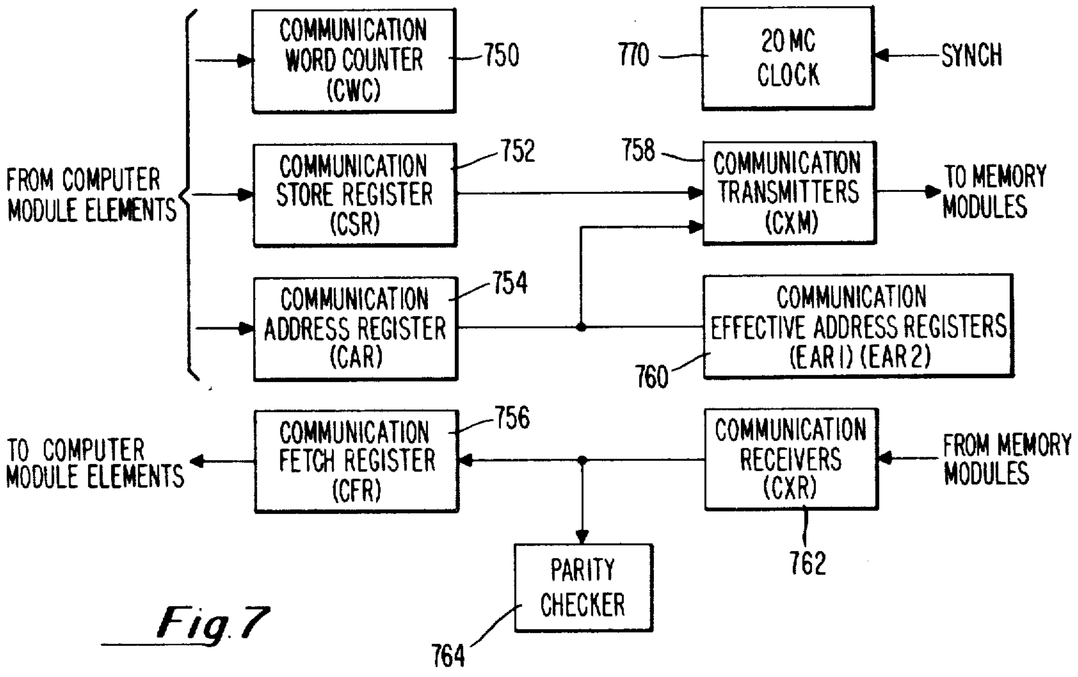
FIG. 7 is a simplified schematic block diagram representative of the communication unit of the illustrative preferred embodiment of FIG. 1.
Figure 8A:
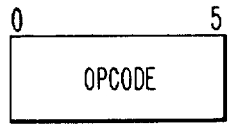
Figure 8B:
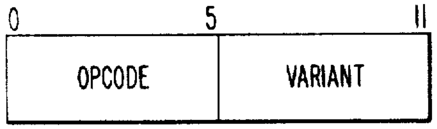
Figure 8C:
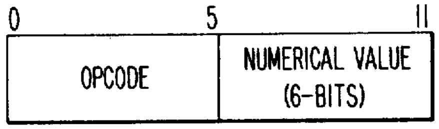
Figure 8D:
Figure 8E:
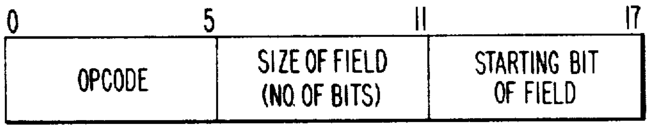
Figure 8F:
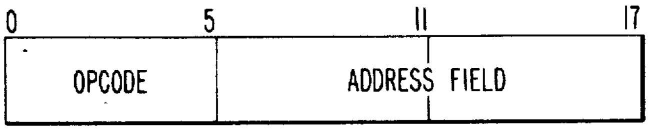
Figure 8G:
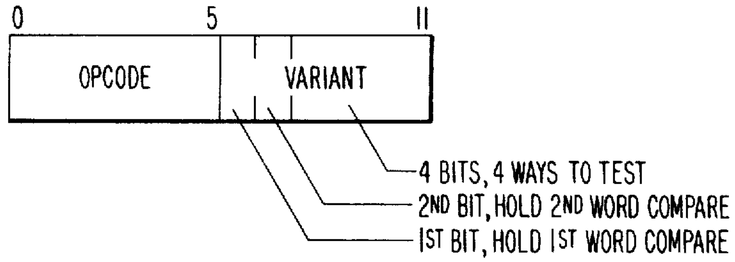
Figure 8H:
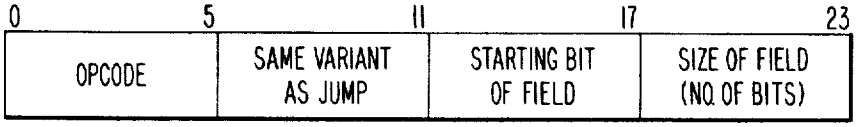
Figure 8J:
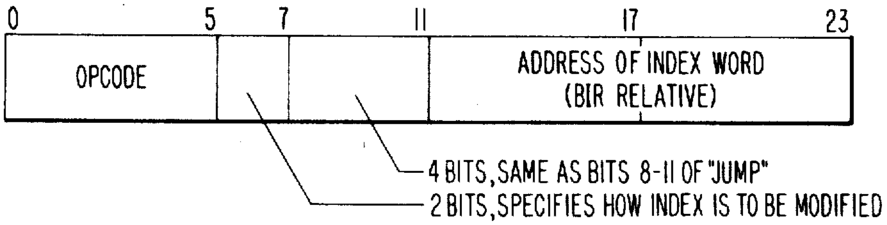
Figure 8K:
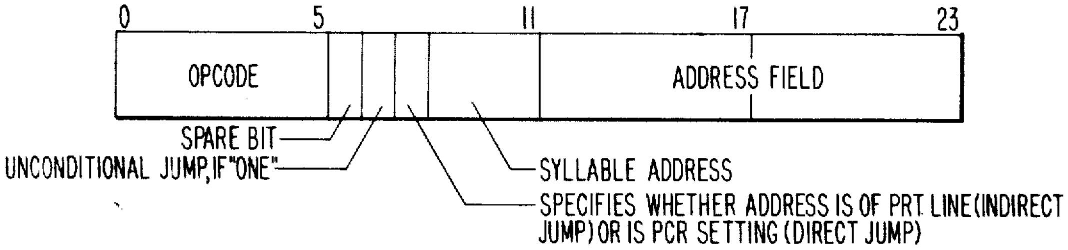
Figure 9A:
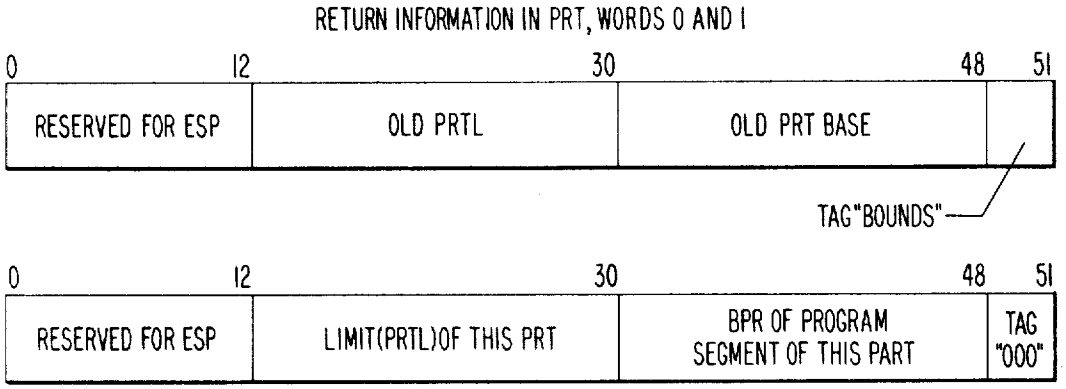
Figure 9B:
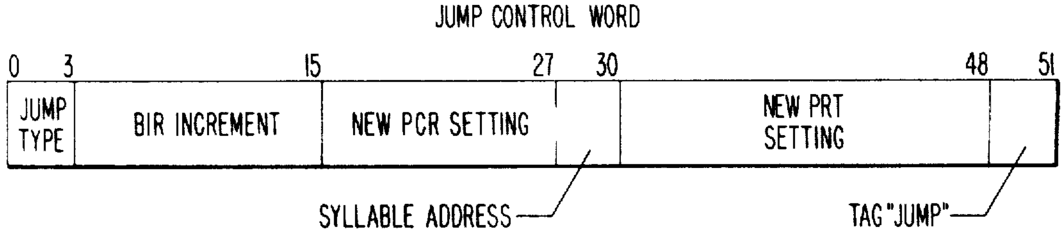
Figure 9C:
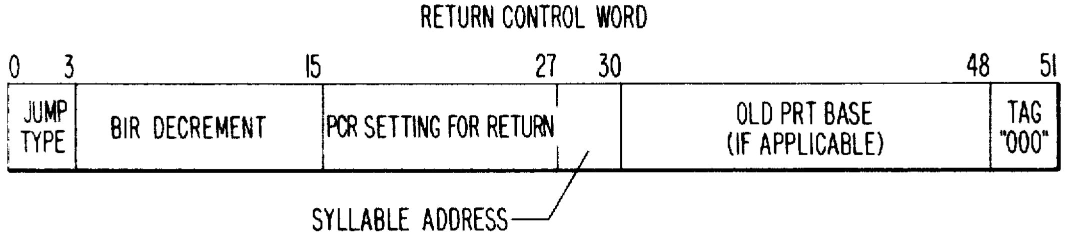
Figure 10:
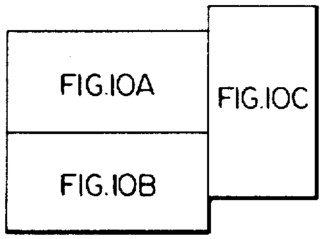
Figure 10A:
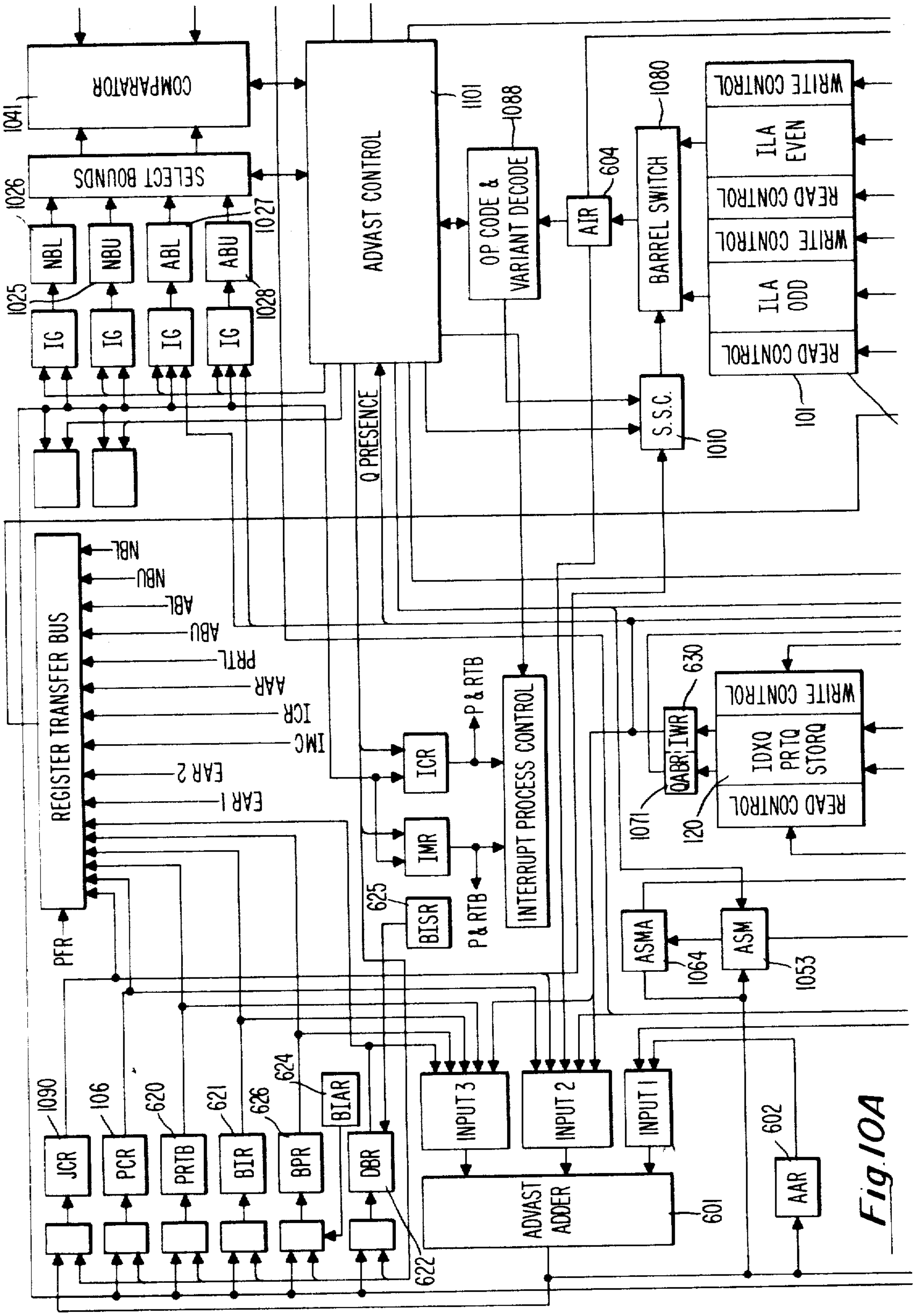
Figure 10B:
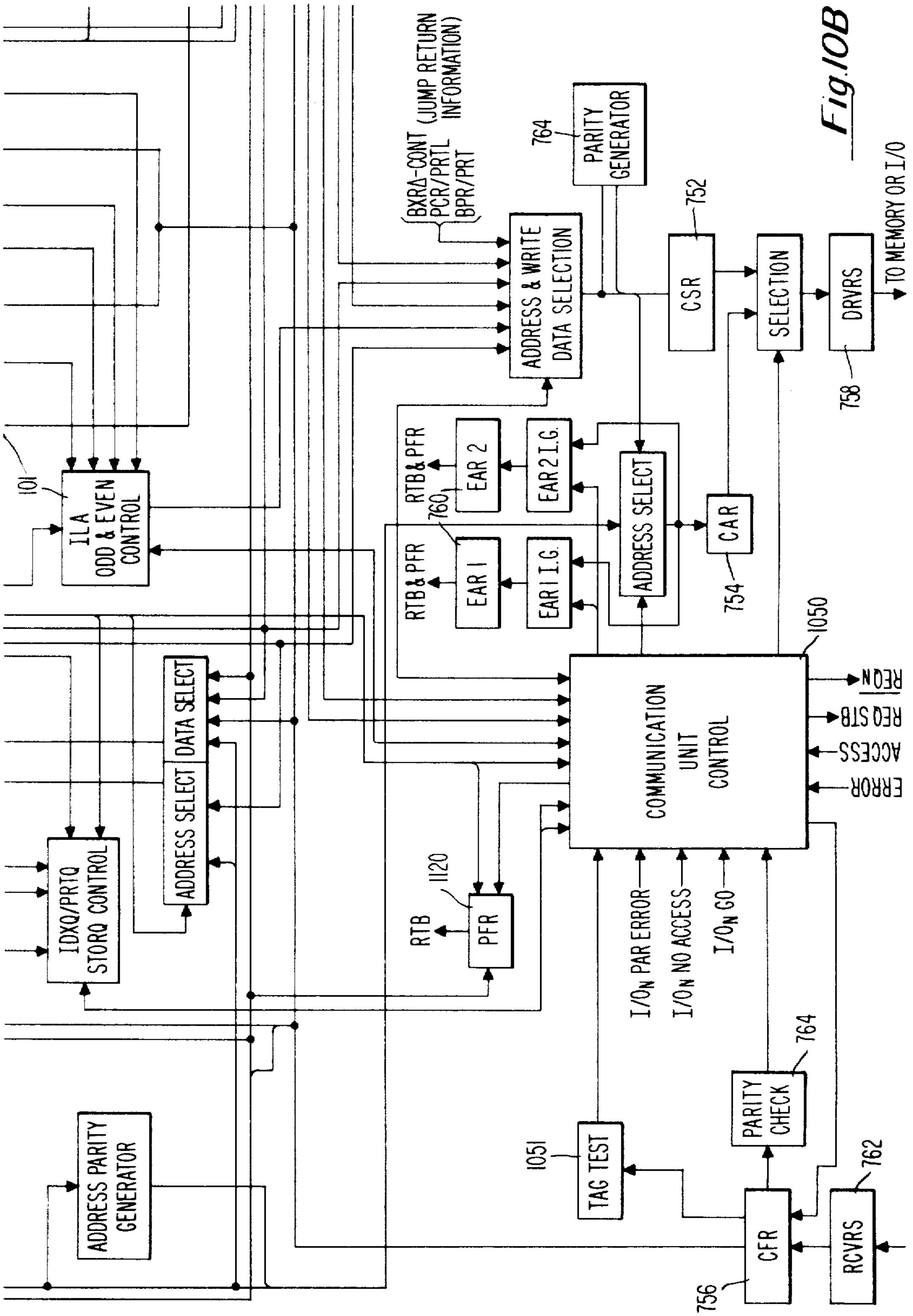
Figure 10C:
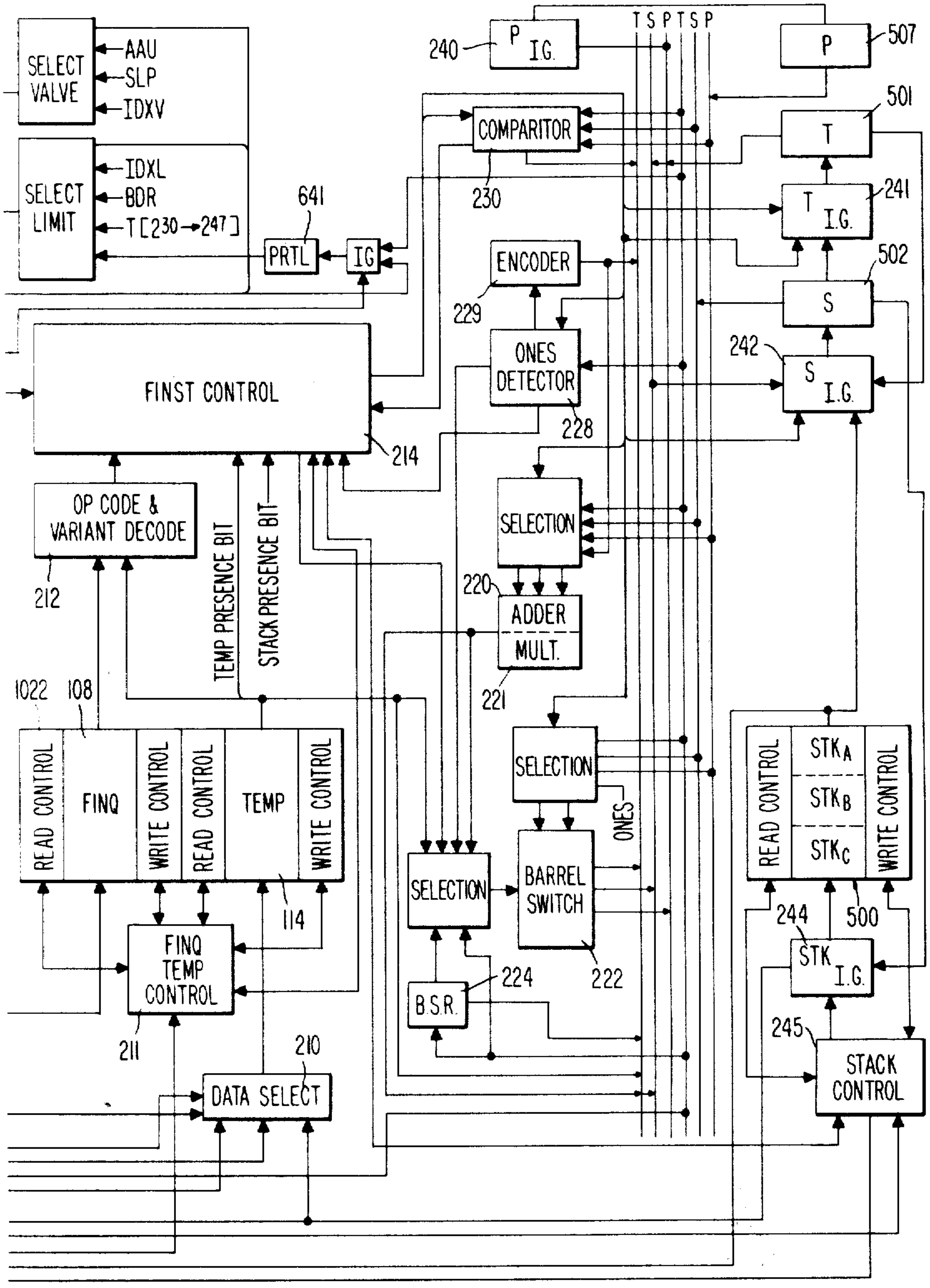
Figure 11:
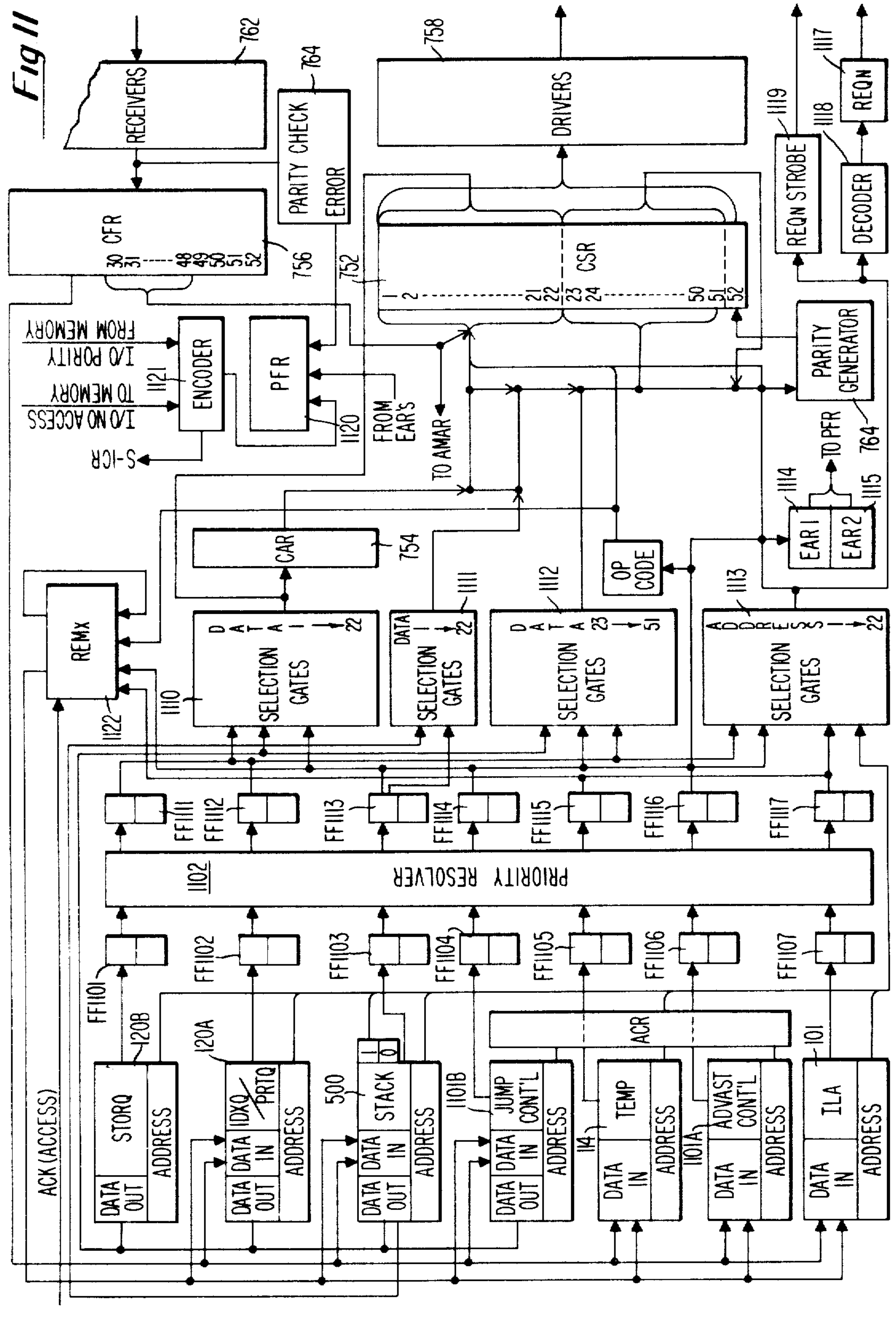

FIGS. 8A–8K are a diagrammatic representation illustrative of instruction formats and showing the bits, bytes and syllables of typical instructions of the various types of instruction words which may be used by the illustrative embodiment of the processor of the present invention, and wherein FIG. 8A illustrates the format which may be used for one-syllable instructions, FIGS. 8B and 8C illustrate the alternative formats which may be used for two-syllable instructions, FIG. 8D illustrates the (four-syllable) address-bearing instructions, FIG. 8E illustrates the field instructions, FIG. 8F illustrates the format of three-syllable instructions, FIG. 8G illustrates a jump (special case of two-syllable instructions), FIG. 8H illustrates a jump on field test instruction, FIG. 8J illustrates a jump on index test instruction, and FIG. 8K illustrates the set-up jump instructions;

FIGS. 9A–9C are a diagrammatic representation illustrative of word format similar to the representation of FIG. 8 but showing the bits, bytes, and organizational arrangement of words in the program reference table which are utilized as jump instructions and return information in implementing the functions of the executive program and associated processor equipment to effect jump operations and wherein FIG. 9A illustrates the return information in the program reference table, words "0" and "1," FIG. 9B illustrates the jump control word, and FIG. 9C illustrates the return control word;

FIG. 10 is a schematic block diagram of the illustrative embodiment of the invention shown in FIG. 1 but bringing in many more details, and is composed of FIGS. 10A, 10B and 10C intended to be placed together in organizational relationship in accordance with the arrangement illustrated in FIG. 10 itself; and FIG. 11 is a schematic block diagram of the communicational unit of FIG. 7 but illustrating this unit of the preferred illustrative embodiment in greater detail.

Referring to the drawings and in particular to FIG. 1, the simplified block diagram of the preferred illustrative embodiment of the processor system of the present invention, the computer of the invention is designed for high-speed execution of programs. To this end it processes in parallel through several sets of hardware, on program strings which were written as though they were going to be executed one program step at a time on conventional nonparallel machines. The instruction string is composed of instructions which in principle are somewhat like the instructions in the Burroughs B 5000 and B 5500 computer systems manufactured and sold by the Burroughs Corporation, Detroit, Mich., the assignee of the present invention, and described in the aforementioned manual entitled Burroughs B 5500, Information Processing Systems etc., supra. Some instructions have no address field; some instructions have one. For example, to add a word in memory to the top of the operand stack requires two instructions. The first instruction fetches from memory and places the word in the top of the stack. The second instruction then adds the top two words of the stack. The reason for the separation of the function in the different instructions will become apparent, as is described in FIG. 1, because the instructions to fetch words from memory are in fact executed early in the string so that the data will arrive by the time the instruction to actually perform the addition is executed.

Refer again to the block diagram of FIG. 1. The blocks in the diagram are: a communication unit 100 which handles communications to and from the memory 122; an instruction look-ahead unit 101 for holding unexecuted instructions; a syllable determination unit 102 for unpacking instructions; an advanced station 104 labeled and referred to hereinafter as ADVAST; a program counter 106 comprising a register labeled and referred to hereinafter as PCR 106; a final instruction queue 108 labeled and referred to hereinafter as FINQ (FINQ 108 comprises a set of short registers); a final station 110 labeled also and hereinafter referred to as FINST; a temporary storage area for data hereinafter called TEMP 114; an operand stack 116; an associative memory 19 which has two segments: a portion 118 in which addresses are held and a portion 120 in which data is held. There are also two data paths which are numbered in FIG. 1: a path 119 for addresses going to memory 122, and a path 117 for data coming back to the advance station 104. Not part of the computer module or unit proper but also illustrated in FIG. 1 is a main memory area 122. The term computer module as used herein is not to be limited to mechanical housing boundaries but is a term denoting the means (and method) relating to the independent data processor or computer function.

Referring again to FIG. 1, operation of the computer is as follows: Instructions are fetched from memory 122 through the communication unit 100 to the instruction look-ahead 101. Associated with the instruction look-ahead 101 is an address register ILAR (see FIG. 3 to be described) which holds the address of the instructions to be fetched to the instruction look-ahead 101. This address register will contain an address somewhat ahead of an address which is held in the program counter 106. The instruction look-ahead unit 101 comprises a plurality of registers, for example, 12 registers, also an address register which controls the location in memory 122 from which the next instruction is to be fetched, and also two pointers 301 and 302 (FIG. 3 to be described) which keep track of the number of instructions which are in instruction look-ahead 101 at any time. The two pointers (which may be counters) 301 and 302 operate as a circular buffer wherein a load counter 301 increments by one four times every time an additional four words are fetched from memory and an unload or read counter 302 increments by one every time one word is unloaded from the instruction look-ahead 101 into syllable determination unit 102. The area behind the load pointer 301 and ahead of the read or unload pointer 302 is full of valid instructions. The area behind the unload pointer 302 around to the next load pointer is full of used instructions.

Figure 3:
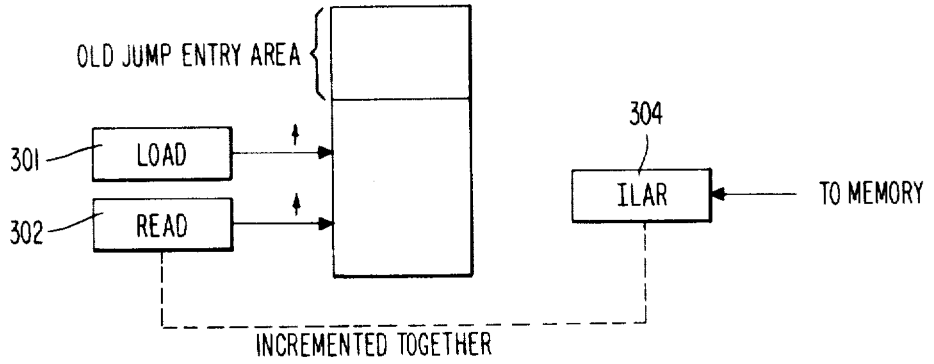
FIG. 3 is a schematic block diagram representative of a preferred embodiment of an instruction look-ahead unit employable with the illustrative embodiment of the invention shown in FIG. 1.

That is, the two pointers designated the "load" and "read" (or alternatively "unload") pointers operate as follows. The load pointer 301 is a recycling counter which in a 12-instruction look-ahead embodiment, for example, counts initially from 0 to 11 corresponding to the 12 registers in the FIG. 3 illustrative embodiment of instruction look-ahead unit 101. Unless a jump instruction is executed by the program the load pointer recycles from the fifth register to the twelfth register, continuously so recycling, until a jump is executed. In the case of a jump, recycling occurs to the first register. Obviously, the number of registers in any one unit is by way of illustrative embodiment and this invention contemplates use of any number of registers more or less than 12, for example, 16 or 8. The pointer 301 governs into which of the registers the next word from memory 122 is to be placed. In rotating, the register which the counter 301 is presently pointing at is the one which receives the instruction word from memory 122. An ILAR counter 304 is provided. ILAR counter 304 fetches four words at a time from memory 122. To do this the ILAR counter 304 counts from 0 to $2^{18}$ by fours. Therefore, the ILAR counter 304 controls the four-fetch in the instruction look-ahead unit 101. The unload or read pointer 302 at the same time is pointing to any one of the 12 registers in the instruction look-ahead unit 101. However, the unload pointer 302 is unloading one register at a time. The unload pointer 302 chases the load pointer 301. However, whenever the unload pointer 302 gets within four registers of the one to which the load pointer 301 points, then the look-ahead 101 is caused to fetch four more words from memory 122 and the load pointer 301 is incremented by one four times, thereby tending to keep the gap always at four registers or more. However, a delay which might be caused by conflicts with other memory accesses may cause the gap to narrow to three, two or even one.

The instructions pointed to by the unload pointer 302 are transferred to syllable determination unit 102. Syllable determination unit 102 comprises a barrel switch 1080 which gates hold two words of instructions for this purpose. These two words include the next instruction which will be requested by the advance station unit 104, plus one additional word. Syllable determination unit 102 comprises also a counter which counts syllables. There are eight 6-bit syllables in every instruction word. There are a number of syllables, one or more, in every instruction.

The two instruction words gated in syllable determination unit 102 contain 16 syllables of 6 bits each. These 16 syllables comprise a portion of the program string. Individual instructions may be one, two or more syllables long. The syllable determination unit 102 comprises also a syllable shift counter (SSC), a 16-counter 1010 (FIG. 10), which indicates the next syllable which has not been transferred to the advanced station 104. The syllable determination unit is not shown in detail separately but it is shown in detail within the detailed schematic block diagram of FIG. 10.

Upon the completion of the current instruction in the advanced station 104, the pointer 1010 indicates the next instruction to be transferred to the advanced station 104. The syllable pointed to by the pointer 1010 plus the next three syllables are all transferred to the advanced station 104, in case the instruction happens to be as long as four syllables, which is the maximum instruction length. The new instruction transferred to ADVAST 104 is decoded to determine how long it actually is, and the counter 1010 then increments it to the first syllable of the next instruction, which may be one of the syllables already transferred to ADVAST 104.

The advanced station 104 comprises the four-syllable instruction register which was mentioned in the description of the syllable determination unit 102, the coding equipment for the instructions, counted off by the program counter 106, several types of base address registers and other registers. The primary purpose of ADVAST 104 is to decode those instructions having to do with the computation of addresses and the fetching of data so that data fetches can be initiated before the computation of the data itself has to be done. Instructions having to do with computation are merely passed by ADVAST 104 to final queue 108 where they await execution. Instructions for computing addresses are used to compute those addresses; the addresses when manufactured are passed to the communication unit 100 for fetching data from memory. Jump instructions are also executed at the advanced station 104. If the jump is a test on an index register the index register is compared with its final value at the advanced station 104, and the jump taken, even though not all of the computations associated with that particular branch may yet be finished in the final station 110. If, on the other hand, the jumps require a test of data, then the system waits for the final station 110 to compute the data which is to be tested. This will in general empty out the final queue 108. A lack of appreciation of the last point is one of the things which interfered with the attempts to provide look-ahead in systems lacking incorporation of the present invention. In such lacking systems, before the data was manufactured it was guessed as to which way the program string would go. As a result, such systems very often had to back up and undo a lot of data manipulation.

INDEXING

Indexing is a process employed in programming for going through a number of items and performing the same action on all of them. It comprises adding a number to the address of a piece of data. This number may be incremented each time a pass is made through the piece of data. Since the operations that are going to be performed on the piece of data are the same each time, the same program code is run through each time. This means that at the end of the piece of program code the index register is changed by one so that next time through it will operate on the next piece of data and the index register is also tested to determine if it has reached its limiting value, that is, to determine whether or not all the pieces of data have been operated upon. This operation is one which can be specified beforehand by the programmer. It therefore is built into the program string and is not dependent upon what happens to the data. It has been predetermined beforehand whether these things are to be done to the data independently of what happens to the data. It therefore does not interfere with operation if the instructions to operate on the data are still waiting in the final queue 108 unexecuted at the time the advanced station 104 tests the index register IDXQ (FIGS. 6 and 10) against its limiting value and as a result starts operating in accordance with the program steps stored in the place (memory address) indicated by the index test instruction. It is known that such instructions will eventually get done as the final queue 108 empties out.

Now referring back to the instruction look-ahead unit 101, a practical embodiment is pointed out herein as among those contemplated as within the scope of the invention, but the invention is by no means to be considered as restricted to this embodiment. The embodiment contemplates the use of the storage area with pointers. The described embodiment is shown in FIG. 3. In the illustrative embodiment the load and read pointers 301 and 302 are provided and pointers 301 and 302 only cover an area of 12 words in the instruction look-ahead means 101. In the embodiment it is the intent to have on hand within the instruction look-ahead area 101 a block of, for example, four program words, which has some segment of program to which the program string may jump upon the next transfer of control. Transfer, jump and branch are all synonyms.

Thus, in the instruction look-ahead unit 101 which has been discussed there is provided a 12-word unit which words may comprise 52 bits, 48 of which are instructions, 3 bits of which are flag bits and one bit which is parity.

Also, there is provided a pair of pointers: first, a load pointer 301; and second, a read pointer 302. The load pointer 301 and read pointer 302 may each be counters, for example. Whenever the read pointer 302 is following the load pointer 301 to narrow the gap to four words or less an additional fetch will be made automatically from main memory 122 to fill the area ahead with instructions. An independent register, an instruction look-ahead address counter 304 (shown in FIG. 3), is provided which actually provides the first address in main memory 122 from which the fetch will be made.

In the illustrative example embodiment of FIG. 3 of instruction look-ahead, an area of instruction look-ahead 101 to which it is hoped to short-circuit the fetching of instructions upon jump-in is provided. The four-word block designated old jump entry area containing the old jump entry point is saved. Normally, then, in the illustrative example embodiment the instruction look-ahead 101 comprises a 12-word circular buffer as described above with a read pointer 302 and a load pointer 301. The additional four words in the twelve contain the point of entry at the last jump. The rationale here is that quite frequently programs repeatedly jump to the same entry point. Upon jumping to the same entry point the words already in instruction look-ahead 101 are again used. If a jump is made to a new entry point, the four words of the old jump entry are ignored and new instructions are fetched.

The term scratch pads, or scratch pad memories, as used herein refers to small, uniform access memories (or portions thereof), with access and cycle times matched to the clock of the logic, and which are closely coupled to the source and/or sink of the data. These may comprise local register 126, temporary storage 114, stack extension 500, and local data buffer 124 which might comprise a first scratch pad and instruction look-ahead 101, the associative memory 19 including the program reference table and index word queue and the storage queue, which may comprise a second scratch pad.

Now refer again to FIG. 1 and particularly to the associative memory 19 in the computer module. The associative memory 19 comprises two sections, 118 and 120. It comprises space for 28 addresses and space for 28 data words, that is, an address section 118 and a data section 120. Each address is a memory address; each data word is, under appropriate conditions, a copy of the data word which is found in memory 122 at the address associated with it. The associative memory 19 is used to short-circuit the fetching process to memory 122. Whenever an address is sent to memory 122 for fetching it is compared against the address field 118 of the associative memory 19. If the comparison succeeds, the data field in the associative memory 19 is selected instead of the data field in main memory 122. The associative memory 19 is used for three classes of data. It is used for those words which are used as index words; it is used for the indirect addresses in the program reference table; and it is used for words which are being stored. These three functions are illustrated in the unit 19 also shown in FIG. 10 and will now be discussed in order.

Index words are held in memory 122 and are given memory addresses. Whenever an index word is referred to which is not in the associative memory 19, an old item in the associative memory 19 is stored back into main memory 122 and the new item which was referred to is fetched from memory 122 and used. Its address and data are left in the associative memory 19 once it is used, on the assumption that index words will be soon and frequently used.

The second use of the associative memory 19 is for the indirect addresses in the program reference table. The program reference table is hereinafter also abbreviated PRT. Program reference table indirect addresses are to some extent similar to index words. They are called for from memory 122 in order for the advanced station 104 to use them to generate addresses of data. A 24-word section (IDXQ and PRTQ, see FIG. 10) of the associative memory 19 is reserved for both index words and program reference table lines. This 24-word section of associative memory 19 is operated as a circular buffer similar to the way that the instruction look-ahead 101 is operated as a circular buffer. Whenever a memory reference is made to a PRT line or to an index word which is not in the associative memory 19 the oldest such line or word is ousted from the associative memory 19 and the one which is newly referred to is inserted at what had been the oldest location. Since PRT lines are never changed, PRT lines are not written back into the main memory 122. Index words, however, are modified as they are used. Therefore, old index words must be written back into main memory 122 so that an updated copy of the index words is held in main memory 122. The address portion 118 in the associative memory 19 is used to control the addresses to which these words are written back into main memory 122.

Associative memory 19 may comprise said index word section designated IDXQ, said program reference table section designated PRTQ and a main storage queue designated STORQ (all shown in FIG. 10 and not numbered).

The third function of the associative memory 19 is called Main Storage Queue. An instruction to store to main memory results in the computation of an address at the advanced station 104. This address is inserted into the next empty slot in the storage queue STORQ (FIG. 10). The storage queue STORQ also is operated as a circular buffer in the same way that the 24-word section IDXQ and PRTQ of the associative memory 19 and the 12-word section of the instruction look-ahead 101, is a circular buffer. The address is inserted into the storage queue STORQ and the associated data section is flagged "Empty." The empty data section is for the data which will be stored in that address when the final station 110 catches up to the same point in the program string.

An individual cell of the storage queue STORQ of associative memory 19 consists of an address and a data section. An instruction to store to memory has the following result. When the instruction comes through the advanced station 104 an address is computed and stored in the address section of the cell of associative memory 19. The data section at this time is marked "Empty." When the instruction to store to memory works its way down through the final queue 108 the data is removed from the top of the operand stack 116 by FINST 110 and placed in the data section of this cell of the storage queue STORQ of associative memory 19. At this time the data section is unflagged empty, and the communication unit 100 is permitted to store.

The storage queue STORQ serves two functions. First, it provides a means such that the operation of storing to memory 122 can be done at leisure by the communications unit 100 and therefore it does not interfere in time with other operations involved in going to memory 122. Second, and far more important however, is the fact that the storage queue STORQ is needed in order to prevent the following troubles. When data is fetched from memory 122 it must be insured that the data fetched is the last copy which has been generated in the program's string. If the advanced station 104 is running ahead of the final station's manufactured data (FINST 110) it is possible for the advanced station 104 to try to fetch words from memory 122 before the final station 110 has manufactured the words which are to be fetched. By having the address in the storage queue STORQ, any word which is to be stored back to memory 122 and has not yet arrived there will be recognized. The address of such a word is recognized when the fetch instruction address is compared against the circular memory; if data is flagged empty this means that the word cannot be fetched yet.

Figure 4:
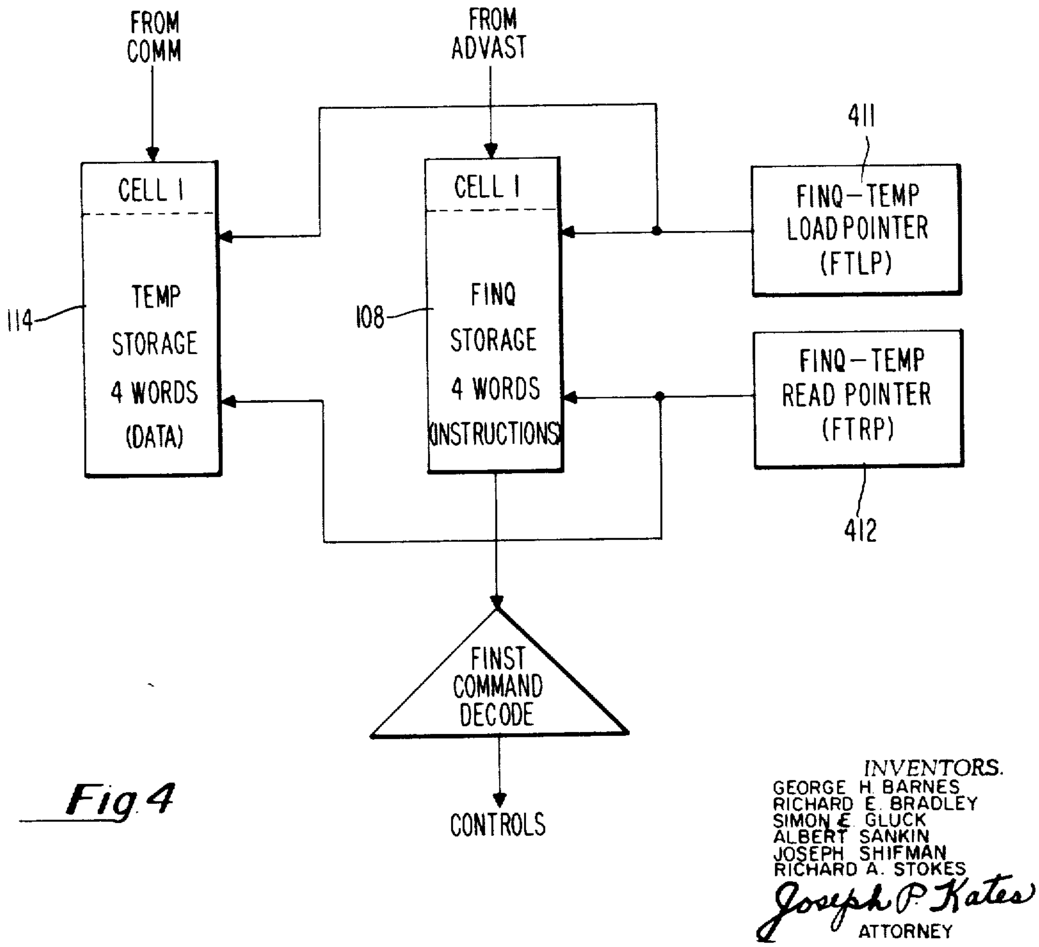
FIG. 4 is a schematic block diagram illustrating the relationship of the final queue, temporary storage and final station units of the illustrative embodiment of the block diagram of the inventive system shown in FIG. 1.

Now refer to the final queue 108 and temporary storage unit 114 of FIG. 1. The final queue 108 consists of enough registers to hold four instructions, arranged in a circular buffer, like the three circular buffers in this computer module described hereinbefore. A load pointer 411, the FINQ-TEMP Load Pointer (FTLP) of FIG. 4, is provided primarily for the use of the advanced station 104 and marks the point at which the advanced station 104 will insert instructions which the advanced station 104 is through with but whose execution has not yet been finished. The execution of such instructions is to be finished by the final station 110. An unload or read pointer 412, the FINQ-TEMP Read Pointer (FTRP) shown in FIG. 4, marks the end of the queue and represents the place where the instructions are transferred to the final station 110 for the completion of their execution. The final queue 108 and temporary storage unit 114 are illustrated in the schematic block representation of FIG. 4. The temporary storage 114 may comprise four cells, each one 52 bits long, for holding data words which are in one-to-one correspondence with the four cells of the final queue 108. The cells of the final queue 108, on the other hand, contain only short storage, for example, seven bits each, for instructions.

Some of the instructions in the final queque 108 make no use of their associated temporary storage in TEMP 114. Examples of such instructions are multiply, divide, add, and test instructions which compare the top two words of the stack, and so on. Some of the instructions are instructions specifically referring to their associated cell in temporary storage 114. These instructions comprise primarily the one instruction which transfers from temporary storage 114 to top of the stack 116 (see T.O.S., FIGS. 5 and 10). This instruction in the final queque 108 may result from a number of instructions which were seen at the advanced station 104, including transfers from memory to temporary storage 114, transfers from local data buffer 124 to temporary storage 114, transfer from address register AAR 602 (FIG. 10) to temporary storage 115, all will appear in the final queque 108 as an instruction to transfer from temporary storage 114 to the top of the stack 116. The AAR 602 is the central accumulator of the advast unit (see FIG. 10).

Now refer to the final station 110 in FIG. 1. The final station 110, upon the completion of any given instruction, extracts its next instruction from the place pointed to by the final queue read pointer 412 of the read control 1022. The instruction register of the final station 110 has a decoding matrix 1023 (FIG. 10) which aids in the execution of the instructions. Outputs from the decoding matrix 1023 operates adders, comparators 1021, a barrel shift register 1020, and other logical networks. FIG. 10 illustrates these circuits and their interaction. The description of FIG. 2 describes FINST 110 in detail.

Figure 5:
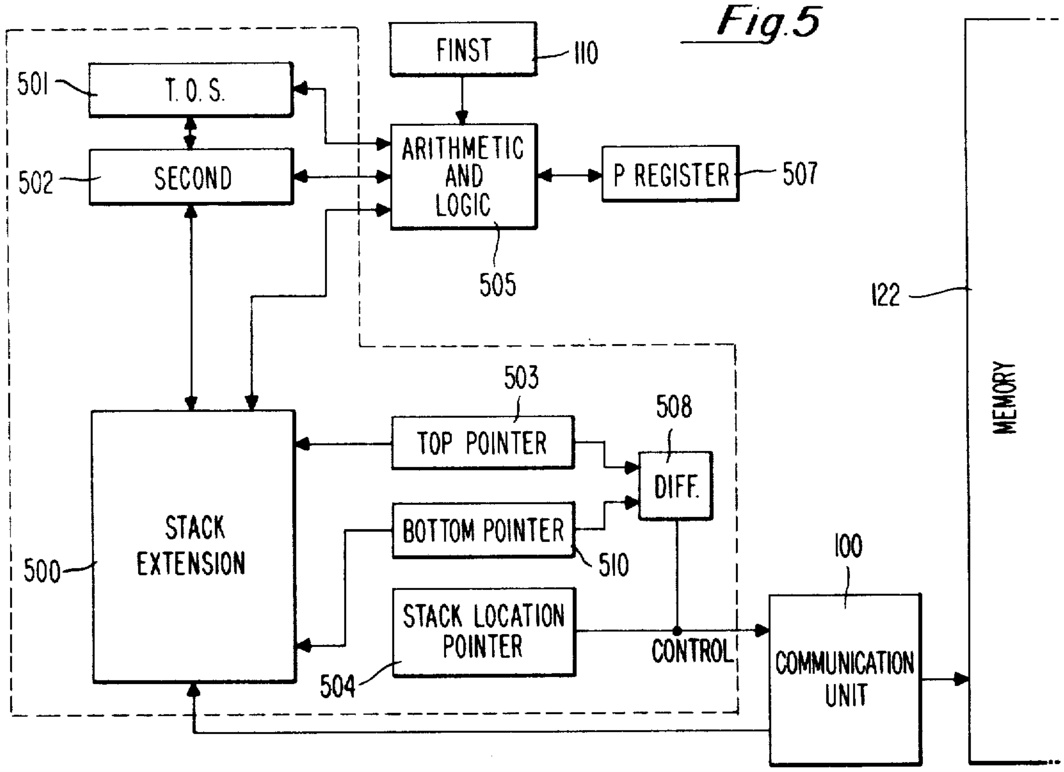
FIG. 5 is a schematic block diagram illustrating in greater and additional detail and in explanatory arrangement the operand stack, final station and its associated control, communication unit and its associated controls of the illustrative embodiment of FIG. 1.

The next section illustrated in FIG. 1 is the operand stack 116 and illustrated in detail in FIG. 5. The operand stack 116 is similar to the operand stack of the Burroughs B 5000 and B 5500 computer systems illustrated and described in the manual, Burroughs B 5500, Information Processing Systems, Reference Manual, supra. It is a last-in, first-out operand stack and operates with a code in a form known as Polish Notation. Basicallly, Polish Notation is a method for writing expressions without a need for bracket characters to delimit the scope of an operator. This operand stack and Polish Notation use therewith are described in U.S. patent application S.N. 84,156 of King et al., filed Jan. 23, 1961, for Digital Computer, assigned to the assignee of the present invention, and that application is incorporated by reference into this present application. Both the Burroughs Corporation B 5000 computer and the processor of the present invention achieve unlimited length of stack by storing excess stack words back into memory under hardware control. The illustrative embodiment machine of the invention differs from the commercial embodiment of the B 5000 computer in this respect by the number of words of stack which are held within the processor module itself before the excess is shipped back to memory. A portion of "scratch pad" storage 116 (see FIG. 5) is reserved within the computer module for stack words which are within the computer module. When this portion reaches a full 12 words, for example, then a store of four words to memory 122 is initiated by hardware since the stack 116 is full. When the portion in the computer module becomes less than four words, a fetch from memory 122 is initiated. It should be understood that in this system memory 122 will be one of the memory modules provided, but the invention is by no means to be construed as restricted only to use with this type of memory. Any stack operations which fill the stack 116 less than 12 words or empty the stack 116 more than four words are therefore accomplished without any transactions with memory. Since normal operation with the stack 116 results in the stack expanding and decreasing by only a few words at a time, this means that memory transactions from the bottom of the stack 116 are held to a minimum. These 12 words just described are referred to as stack extension 500 illustrated in FIG. 5, and are indicated in FIG. 1 by the legend stack extension on the connecting line drawn between the stack 116 and the communication unit 100.

Referring to FIG. 5, associated with the 12-word stack extension area 500 are additional registers. A few registers for data, optionally two or more, and as illustrated by way of example in the illustrative embodiment of FIG. 5, two registers hold the first two words on top of the stack and are separate from the 12-word stack extension 500. Associated with the 12-word section 500 are a top pointer 503 which indicates the top word in the stack 500 of the 12 words stored. Two registers, for example, top of stack register 501 and second register 502, may be provided and the first two words of the top of the stack may be in these additional registers 501 and 502, not in the "scratch-pad" portion 500 of the stack 116. The "scratch-pad" portion 500 of the stack is also herein termed extension, stack extension or stack extension memory. Associated with the stack extension 500 are a top extension pointer 503 which points to the data word whose position in the stack 500 is directly under those data words which are in the flip-flop stack registers 501 and 502. A bottom pointer 510 for the stack extension 500 points to the bottom word in the stack extension 500.

A differencer 508 is provided. Differencer 508 detects the difference between the ordinal positions of the words to which the top pointer 503 and bottom pointer 510 are pointed. When the bottom pointer 504 and the top pointer 503 have a difference of 12 as detected by the differencer 508, the bottom four words are referred back to memory at the location indicated by the stack location pointer 504. When the bottom pointer 510 and the top pointer 503 come close together, four or less as detected by the differencer 508, this indicates that the stack extension 500 contains four words or less. When this happens four words are fetched from memory 122 from the location pointed to by stack location pointer 504. Upon fetching or storing from memory 122, the stack location pointer 504 is incremented or decremented by four words.

The stack location pointer 504 is set initially by the executive program to indicate the area of memory which has been assigned to set stack extension. It automatically increments and decrements as words are stored to or fetched from memory. Normally, one possible trouble that the stack location pointer 504 may get into is to try to store too many words back to memory 122 because the stack is getting too deep. At a later point in this discussion the memory bounds protection will be described as associated with the advanced station 104. The stack location pointer 504 is compared against the memory bounds which have not yet been described. This is necessary in case the stack 500 becomes too full and overflows the area assigned to it in memory.

An arithmetic and logic unit 505 is provided, which comprises a set of conventional arithmetic logic which can perform addition, multiplication, division, subtraction, comparisons and certain logical functions, including AND, NOT, IMPLY, Exclusive OR, and transfers. Responsive to the decoding language in the final station 110, the arithmetic and logic unit 505 causes the data in the top of the stack 501 and in the second register 502 from the top of the stack 501 as applicable to have the corresponding arithmetic manipulations performed upon them the result being placed in the top of stack 501. A private register 507 is provided and in the case of such operations as divisions and multiplications the respective remainder or double-length multiple product is placed into the private register 507.

Referring again to FIG. 1, in addition to those components already mentioned, the illustrative embodiment computer module or processor comprises in the "scratch pad" memory an area designated as local data buffer 124 and another area designated as local register 126. Both these areas 124 and 126 are directly addressed by instructions to load register, read register, dump register, etc. Load register and dump register call on four fetches from memory and four stores to memory, and therefore constitute a way in which the programmer can "four-store" and "four-fetch" data to and from memory. In general all registers in the illustrative embodiment of the invention are addressable. This means that when a programmer states "read register" and specifies a register number, the processor will transfer the contents of that register from the register to the top of the stack 501. All registers are assigned numbers. Most registers have specific functions, such as the barrel shift register 224, the normal bounds upper register 1025, the lower normal bounds register 1026, the PRT base register 620, and so forth (see FIGS. 6 and 10). Many of the less frequently used registers are not constructed out of general purpose flip-flops, but are held in the processor's "scratch pad" storage. In this case the address of the register becomes the address in local scratch pad. Approximately 32 of these registers are in scratch pad memories rather than being explicitly constructed out of flip-flops. In addition to the scratch pad registers which are assigned specific uses, 16 scratch pad registers have been purposely left unassigned so that the programmer can use them in any way he sees fit. This section, which otherwise would be part of the local registers, is termed the Local Data Buffer 124. Optional embodiments are conceivable in which there is no special area designated local data buffer, and main memory portion would be used instead for its functions.

Figure 6:
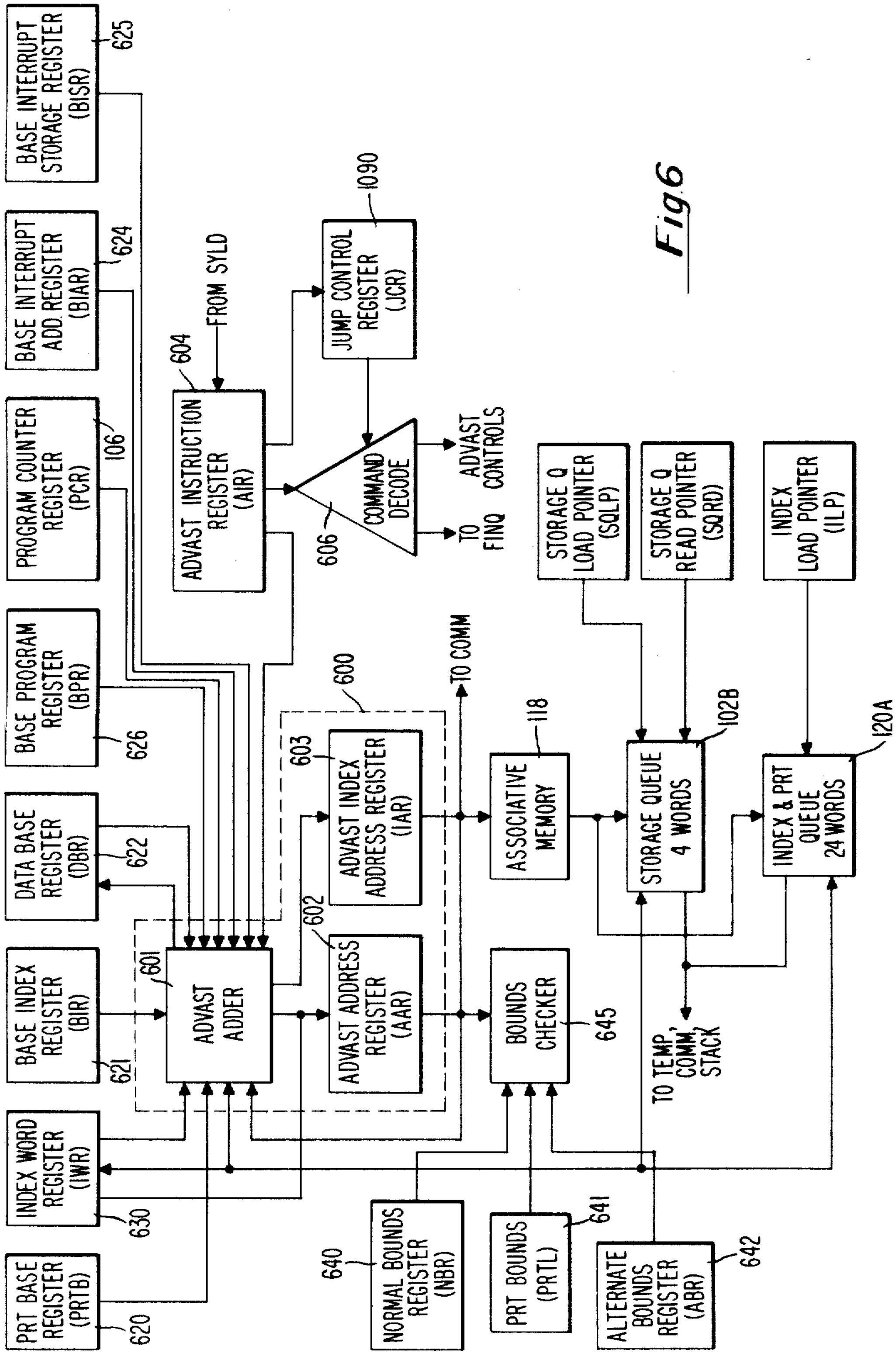
FIG. 6 is a schematic block diagram illustrating the advanced station unit and associative memory unit of the illustrative embodiment of FIG. 1.

The advanced station 104 is shown in detail in FIG. 6. At the center of the advanced station 104 is provided the control arithmetic unit 600 shown enclosed by dotted lines. The control arithmetic unit 600 comprises an advast address register AAR 602 and an advast adder 601 which are provided and serve as an accumulator. Provided as a portion of the control arithmetic unit 600 is also an advast index address register IAR 603 which together with the adder 601 serves as an alternate accumulator. Generally addresses are computed by adding three items together. These three items are: (1) the contents of a base register, (2) the previous contents of the address register 602, and (3) the address field from the instruction. An ADVAST instruction register (AIR) 604 is provided and holds the address field in the instruction, (3) above; the previous contents of the ADVAST register 604 are held in the address register 602; a number of different base registers are provided and the base register item is selected from one of these base registers. These provided base registers comprise the base register for the program reference table (PRTB) 620, a base index register (BIR) 621, a base data register (DBR) 622, a base interrupt address register (BIAR) 624, and a base interrupt storage address register (BISR) 625. The program counter (PCR) 106 may also be used as a base register. There is provided also a base program register (BPR) 626.

For clarification the uses of these registers are described now. The PRT base register 620 points to the base of the program reference table. The program reference table is a read only table of indirect addresses and other information.

The base index register 621 points to an area of memory which is used to store index registers. Base index register 621 is stepped or advanced at every entry into another subroutine level. The stepping of the base index register 621 gives a stack of working storage areas and index areas for each subroutine level. The base index register 621 normally points to an area within the normal memory bounds. The normal memory bounds are described hereinafter. The base data register 622 indicates an area of working storage. Some compiled programs may, in fact, ignore this last-mentioned working storage area indicated by DBR 622. The base program register 626 points to the beginning of the segment of code currently being executed. The program counter 106 points to the instruction in the current segment of code which is at the moment in the advanced station 104. Fetching with respect to the program counter 106 may be used only for items which can be stored with the program and never changed. Two of the base registers provided, BIAR 624 and BISR 625 are used for interrupt purposes only. Base interrupt address register, BIAR 624 points to the code of the executive program which is to be executed at the time of interrupt. The purpose of the base interrupt storage register, BISR 625, is to point to an area of memory in which the contents of various computer registers can be stored. The reason for such storage is that the executive routine will need computer registers for its own purposes in order to run itself and it will have to save the contents of those registers which the user program was using.

The ADVAST instruction register 604, shown in FIG. 6, obtains its inputs from syllable determination 102 and the outputs of ADVAST instruction register 604 are decoded in a decoding network 606. The decoding network 606 has two primary outputs. It supplies the transformed code which is loaded into the final queue 108 (see FIG. 1 also). Its outputs also serve to control all the operations of the advanced station 104.

The function of the advanced station 104 is primarily to compute addresses. These addresses are stored in the address register 602 after they are computed. From the address register 602 the addresses go to three places: they go to a bounds checker 645, to the address portion, 118 of the associative memory 19, and to the communications unit 100, so that they may be effective in fetching data from memory 122. Every address resulting from an address-producing instruction in the instruction register 604 (FIG. 10) is the sum of three items: the address field corresponding to the instruction (input 2, FIG. 10), one of the several base registers as selected by the instruction (input 3, FIG. 10), and the results of previous indexing which is stored in AAR 602 (input 1, FIG. 10). After every use of AAR 107, AAR 602 is cleared to zero, so that previous addresses are not erroneously added into subsequent addresses. As stated, each address so produced, when finally used, is sent three places: to the bounds checker 645, to the address section 118 of associate memory 19, and to communications unit 100.

The associative memory 19 has been already described. It receives the address which has been computed and checks to see if the data associated with that address is already held in the processor or not. If so, the instruction to communication unit 100 is stopped and the data which is already locally available is used.

Communication unit 100, unless otherwise instructed, will send the address to memory 122 and receive from memory 122 the data at the location specified by the address.

The bounds checker 645 checks the address against memory bounds. Unless otherwise instructed, the bounds checker 645 checks the address against the so-called normal memory bounds. There are both upper normal memory bounds 1025 and lower normal memory bounds 1026 (see FIG. 1). Both these bounds registers 1025 and 1026 can be thought of as being included in the normal bounds register (NBR) 640. With exceptions to be noted later, any address not within the normal memory bounds 640 is cause for interrupt.

A variation of this procedure for fetching data from memory 122 is encountered when the program reference table is used. A program reference table bounds register, PRTL 641 is provided and employed in this procedure. An instruction to fetch from memory 122 to the address register 602 and specifying the program reference table base register 620 contents as the base will cause the process to compute an address relative to the PRT (program reference table). This address is now checked to see that it is between the contents stored in the program reference table base register 620 and the program reference table limit register 641 which serves as an upper bound. If the instruction to fetch to the address register 602 from memory 122 and with respect to PRT produces a valid address between the PRT base register 620 and the PRT limit or PRT upper bounds register 641 the word is fetched from the PRT to the QBR register 1071 (FIG. 10). This word which has been fetched from the program reference table may be tagged in any one of various ways. The most straightforward method of tagging is a tag code which signifies to use alternate memory bounds. If the word is tagged "Alternate Memory Bounds" the last 18 bits of the word are inserted into the address register 602 for use by the next address manufacturing instruction. An additional address field to the left of the right-hand address field is inserted into the alternate memory bounds register 642 and serves to limit the area of memory 122 which can be accessed through this PRT line. It thus becomes impossible by means of the PRT line to access any object which is outside the area which has been designated by the executive routine. An additional code which may be attached to the PRT line is a code which indicates jump. In this case the PRT line becomes an entry to a subroutine and the alternate bounds register 642 is not affected. In some cases the PRT line may be tagged "Interrupt." This happens, for example, if the data object which should be pointed to by the PRT line has not been allocated space in memory, or if for some other reason the executive program does not wish that particular PRT line to give access to that data.

The index address register 603 is used as the accumulator in computing the addresses which point to index words. A separate accumulator is used for pointing to index words because the regular address register 602 may be stating the results of previous indexing, or the contents of a PRT entry, which must be left intact while the index word is fetched. Specific indexing instructions make use of the index address register 603.

Some of the remaining elements of the ADVAST unit 104 of FIG. 6 have been described in conjunction with the description of FIG. 1 and this description will not now be repeated.

The index word register, IWR 630, shown in FIG. 6, is provided and provides a place for installing the index words or PRT lines which are found in the index and PRT data area IDXQ and STORQ. This is shown in contemplation of these data areas being held in a thin-film memory which is time-shared with many other functions. Where the embodiment of the invention is implemented by microelectronic scratch pads or integrated circuits, then this data area will be segregated from those of other functions and the index word register 630 may not be needed.

Figure 2:
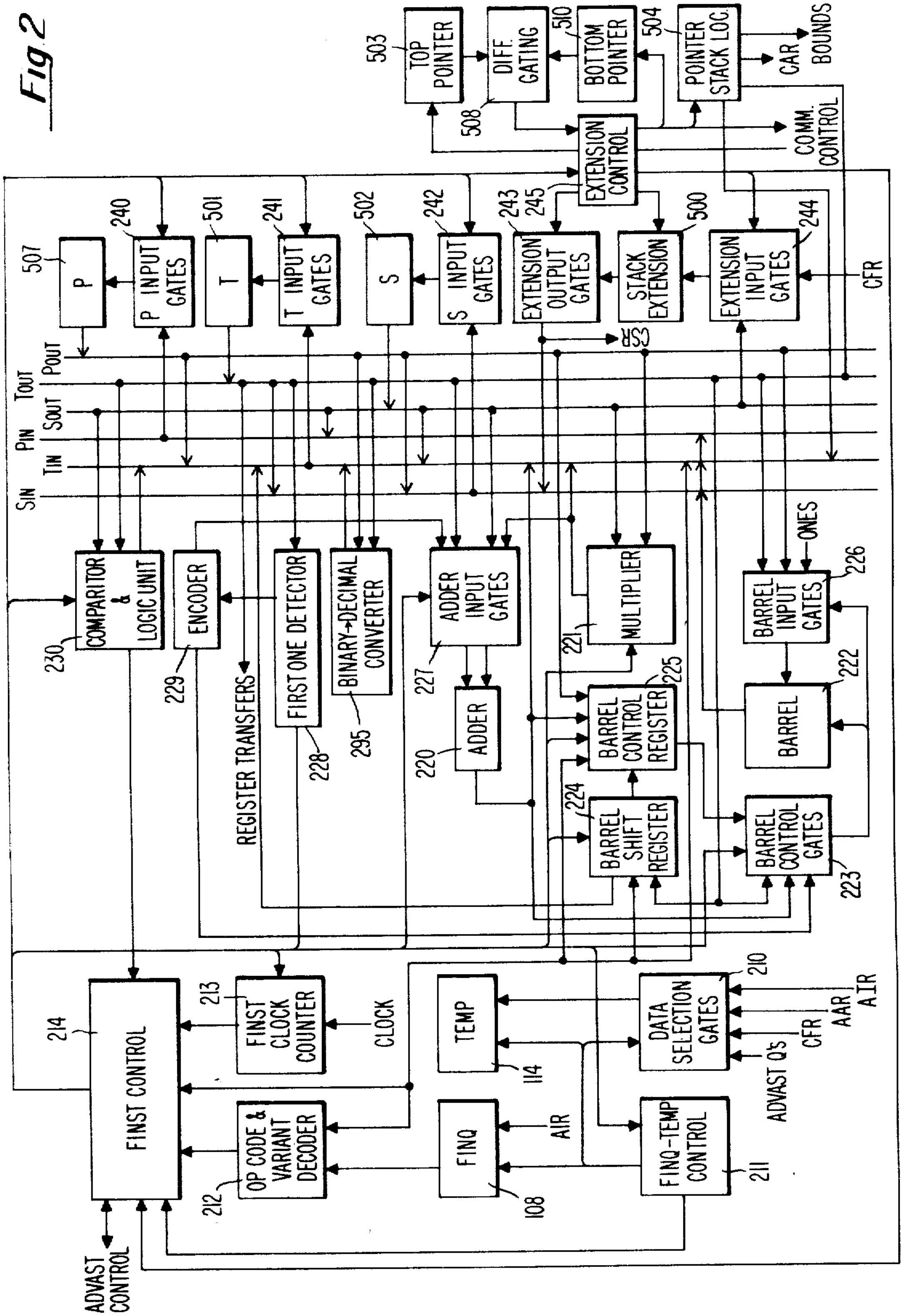
FIG. 2 is a schematic block diagram representative of a preferred illustrative embodiment of a final station unit employable with the illustrative embodiment of the invention shown in FIG. 1.

Now refer to FIG. 2 which shows a block schematic representation in detail of the final station 110 of the illustrative embodiment of the present invention, similar to the showing of the final station 110 in FIG. 10, but providing further details. The final station 110 may be regarded as comprising three subdivisions. The first subdivision or section shown at the left of FIG. 2 comprises data and instruction input means and final station control. Provided to comprise the units of this first subdivision are data selection gates 210 which accept input from the advanced station 104, the temporary storage unit 114, the final queue 108 and responsive to the output of TEMP 114 and FINQ 108 the operation code and variant coder unit 212 is provided. In this subdivision a FINQ–TEMP control unit 211 is also provided which comprises the FINQ–TEMP load pointer 411 and FINQ–TEMP read pointer 412 (see FIG. 4). One load pointer and one read pointer are shown by way of illustration. It is contemplated that alternatively a plurality, for example, two of each of the FINQ–TEMP load pointers 411 and the FINQ–TEMP read pointers 412 may be embodied. In the first subdivision is provided also a FINST control unit 214. The second subdivision of FINST 110 comprises the units illustrated in the central portion of FIG. 2. This second subdivision is the arithmetic section of the final station 110 which comprises the arithmetic units such as adders and multipliers, the shifting devices therefor and the various devices which perform data manipulation and executing instructions in the computer module. Specifically provided in the arithmetic section are units which may comprise an adder 220, a multiplier 221, a barrel shift mechanism 222 and barrel control circuits therefor comprising barrel control gates 223, a barrel shift register 224 and a barrel control register 225. Barrel input gates 226 may be provided to introduce data into the barrel unit 222. The barrel shift register 224, barrel control register 225 and barrel control gates 223 govern the amount and type of shifts which the barrel unit 222 will perform. Provided as input to the adder 220 are adder input gates 227 which introduce data into the adder. A leading one detector is provided for normalizing words. An encoder unit 229 is provided and is used to provide input into the adder 220 and into the barrel control gates 223 for normalizing words. A comparator and logic unit 230 is provided in the arithmetic subdivision to perform comparisons and certain logic combinations. A binary-decimal converter 295 may be provided to convert binary coded data to binary coded decimal form.

The third subdivision is shown to the right of FIG. 2 and comprises the registers and control units associated with the stack. These are the registers holding the information used by the arithmetic section for arithmetic operations. In the third subdivision of the final station unit 110 of the illustrative embodiment of the present invention there are provided (see also FIG. 5 and operational description thereof presented hereinabove) those units comprising and associated with the stack and stack extension means. These means comprise top of the stack register 501, second register 502, stack extension 500, top pointer 503, stack location pointer or extension pointer 504, bottom pointer 510, and difference unit 508. Provided also with this group of registers are the private register (P) 507 (see FIG. 5 also), the P register input gates, 240, the T (top of stack) register input gates 241, the S (second) register input gates 242, the (stack) extension input gates 244 and the (stack) extension output gates 243. An extension control unit 245 is provided and connected between the difference gating unit 508 and the stack extension 500.

Refer again to FIG. 2. When the operand to be fetched is locally stored in the ADVAST queues, that is, the contents of the index queue IDXQ and the program reference table queue PRTQ and the contents of the store queue STORQ in the data section 120 of the associative memory 19, it is fed into the data selection gates 210. When the information is not locally stored the second input to the data selection gates 210 is required, and to obtain the operand, memory 122 must be accessed and the information given to the communications fetch register 756. The third input to the data selection gates 210 is the indexed variant instruction when received from the output of the ADVAST address register 602. The fourth input comes from the ADVAST instruction register 604 (FIG. 6). This input may include as much as the second through fourth syllables of the instruction which has been decoded in command decode unit 606 and the first syllable of which is sent to FINQ unit 108. Thus, the operands and the variants to the instructions are presented to the data selection gates 210. From the data selection gates 210 this information is provided into TEMP 114. Thereby, at this time there are provided instructions in FINQ 108 and there are provided the operands and the variants of the instructions in TEMP 114.

For any one instruction provided in FINQ 108 there may be either an operand or a variant in the corresponding location in TEMP 114, or there may be no corresponding operand or variant. There may be as many as four instructions in FINQ 108 in the illustrative embodiment of the processor of the invention, and it is possible to have as many as four corresponding operands and/or variants in TEMP 114. The FINQ-TEMP control 211 governs where in FINQ 108 and in TEMP 114 the information is inserted and from where in these units 108 and 114 the information is applied. The FINQ-TEMP control mechanism 211 (which comprises the FINQ-TEMP load pointer 411 and the FINQ-TEMP read pointer 412 of FIG. 4 also indicates when FINQ 108 is empty. In that case the FINST control unit 214 is inhibited from trying to recognize the contents of FINQ 108 as a new instruction. The instructions which are taken out at the output of FINQ 108 are decoded Opcode and variant decoder 212. However, if the FINQ instruction output from FINQ 108 indicates that a variant is needed, then the corresponding variant in TEMP 114 must also be decoded by the Opcode and variant decoder 212 simultaneously.

When it is recognized from FINQ 108 that the information in TEMP 114 is an operand, then it is placed in the T register 501. When it is recognized that the information is a variant which is not to be decoded, but placed in some register (such as the T register 501 or the barrel shift register 224), then the variant is placed in that register in accordance with the specific instruction in FINQ 108.

The FINST control 214 contains the command logic, flip-flops, gates, etc. which execute the decoded instruction from the Opcode and variant decoder 212 and causes the appropriate data manipulation to occur in the arithmetic subdivision of the final station 110. The final station control logic unit 214 also presents the commands necessary to cause manipulation of the data contained in the stack 116. That is, the FINST control 214 executes the arithmetic operations and manipulates the stack 116. The final station clock counter 213 presents the timing outputs necessary for the operation of the FINST control unit 214.

The arithmetic section of the final station 110 operates as follows: The adder 220 performs all of the arithmetic operations of the add, subtract and divide instructions. The adder also performs part of the multiply instruction. The multiplier 221 together with the adder 220 is used to execute the multiply instruction. It will be realized, of course, that there are several adding and several multiplying instructions, and the word "instruction" is used in the sense of all of these.

The barrel shift register 224 contains a number which is a shift amount. The barrel control register 225 receives all shift amounts, including the contents of the barrel shift register 224 when called for, except the output of the leading ONE detector 228 and encoder 229. When a shift amount is placed in the barrel control register 225 it is immediately decoded by the barrel control gates 223 and governs the amount of shift of the data placed in the barrel 222. This data is placed in barrel 222 via the barrel input gates 226 from the T register 501 and/or the P register 507 of the stack section 116. The output of the leading ONE detector and the encoder 229 is passed directly to the barrel control gates 223 and governs the amount of shift during a normalization instruction. The barrel input gates 226 present the contents of either the T register 501 or the P register 507 or the contents of both in full for logic shifts. The barrel input gates 226 also offset a portion of the T register 501 for arithmetic shifts. Barrel 222 may comprise three stages. The output of the barrel input gates 226 is passed into the first stage of the barrel 222. The output of the first stage of barrel 222 shifts the input 0, 8, 16, 24, 32, or 40 places. This shifted amount is passed to the second stage of the barrel 222 which executes a shift of 0, 1, 2, 3, 4, 5, 6, or 7 places. This gives a range of shifts from 0 through 47. The output of the second stage of the barrel 222 is passed to the third stage of barrel 222. The third stage is capable of passing the unshifted data. Also, the third stage has the ability to shift the first 48 bits with the second 48 bits of a 96-bit input in order to allow right shifts in conjunction with proper decoding of the srift amount. Thereby, the third stage can make either a left or a right shift possible by exchanging the first 48-bit and second 48-bit sections. The third stage of the barrel also possesses the capability of repositioning the adjusted arithmetic inputs. As stated hereinabove, in order to effect the arithmetic operation, the contents of the T register 501 were offset when placed into the barrel input gates 226. The third stage compensates for this offset. That is, the contents of the T register 501 when first passing through the barrel input gates 226 were offset with respect to the contents of the P register 507 so that the contents of the T register 501 might be placed adjacent the contents of the P register 507 without any bit position spacing between them for the shift operations by the barrel 222. The third stage recompensates for this by again properly positioning the T register 501 and the P register 507 portions so that when restored to the T and P registers 501 and 507, respectively, the contents of each will appear in its proper position.

The third stage of barrel mechanism 222 also ORs together various sections or fields of the second stage output in order to effect a particular variation of the shift, for example, end off or end around.

In an arithmetic operand word the first bit is the mantissa sign, the second bit is the exponent sign and the third through the thirteenth bits are the exponent magnitude. The rest from the fourteenth bit is the mantissa magnitude.

In these arithmetic instruction the uniform notation of the above-described Burroughs Corporation B 5500 computer system is retained such that the integer number has the same representation as the floating point number. An integer has a zero exponent; a floating point number has a non-zero exponent. This method allows one arithmetic instruction to be used with either integer or floating point operands.

The leading ONE detector 228 and encoder 229 together determine the amount of shift necesasry to place the leading ONE of a mantissa magnitude into the fourteenth position of an operand.

The fourteenth bit position of the operand is the most significant bit of the mantissa magnitude. This operation of leading ONE detector 228 and encoder 229 results in normalizing the arithmetic input. At the same time the output of the encoder 229 must be subtracted from the exponent.

The comparator and logic unit 230 has two functions. First, comparator and logic unit 230 compares the T register 501 and the S register 502 outputs to determine equality, greater than, or less than, relationships.

This capability is also employed in executing some of the instructions which will be described wherein it is necessary to compare the exponent separately and the mantissa separately.

In performing its first function of comparing for equal, less than, or greater than, the comparator and logic unit 230 is further capable of taking the entire word for logic comparison, and in combination with the barrel 222 it can select a field for comparison with the field of another word.

The second function of comparator and logic unit 230 is to combine the T register 501 and S register 502 outputs to derive the results of logic functions, for example: AND, OR, IMPLIES, COMPLEMENT. When the second function is utilized the output of the comparator and logical unit 230 is applied into the T register 501.

Now refer to the third section shown to the right of FIG. 2 which illustrates the details of the stack 116 in its operation in conjunction with the final station 110. These registers are shown in FIG. 5 also. The T register 501 is the register at the top of the stack. The second or S register 502 is the next register above the stack extension. The T register 501 is used in every arithmetic instruction. In some cases the T register 501 is used in conjunction with the S register 502 or with the P register 507. That is, the T register 501 may be utilized either alone, or in conjunction with the S register 502, or the T register 501 may be used in conjunction with the P register 507. There are a few instructions which use the T and S registers 501 and 502 together and conjointly utilize some of the registers of the stack extension 500. The T register 501 and the S register 502 may be considered to be a part of the stack. However, the P register is an auxiliary register used to execute instructions were convenient to be employed. The T register 501 contains the sum after an addition or subtraction performed by the adder 220. That is, in the case of either an add or a subtract, the algebraic sum or algebraic difference respectively will appear in the T register 501, and the P register 507 will not show a sensible result for all but a few specialized purposes. In the case of a multiply operation, at the conclusion the T register 501 contains the most significant one-half of the product and the least significant one-half of the product appears in the P register 507. In the case of a division operation, at the conclusion the quotient appears in the T register 501 and the remainder appears in the P register 507. There are double precision instructions and operations possible in the inventive processor. In such double precision cases the most significant one-half of the result appears in the T register 501, the least significant of the result appears in the S. Register 502, and any other result of significance appears in the P register 507, for example, the less significant portion of a sum or product.

The T register 501 is connected directly or indirectly with most of the other registers in the entire central processor. The first path of normal flow of data is from TEMP 114 to the T register 501, thence to the S register 502 and thence down the stack extension 500. The second path of normal flow is from the stack extension 500 through the S register 502 thence to the T register 501, and thence to other portions of the computer modules such as the store queue STORQ of the data section 120 of the associative memery 19. Alternatively, there are paths to other registers.

The stack extension operation has been described in conjunction with the description of FIG. 5. The stack location pointer 504, which is shown both in FIG. 5 and in FIG. 2, contains the address of the next four words in memory 122 to be brought into the stack extension 504 if necessary. The stack extension pointer 504 can be incremented by four and the resulting address defines the location in memory of the block of four words wherein the oldest four operands in the stack extension 500 may be stored, if necessary.

Now refer to FIG. 7. FIG. 7 shows a schematic block representation of the communication unit 100 of the central processor module of the present invention. In the communication unit 100 there may be provided transmitters 758 and receivers 762. Transmitters 758 and receivers 762 may form a portion of a switch interlock which may be provided for the system of which the central processor of this invention which forms a portion of communication among modules or units of the system and for resolving of priorities for access to memory from, for example, processors and I/O control modules of the system. Such a switch interlock may be very similar to the switching interlock described in the patent applications of Hopper et al., Anderson et al. and Mott et al. and the patent to MacDonald et al., supra.

The communication unit 100 may be provided with and comprise a clock 770, the above-stated communication receivers (CXR) 762 and communication transmitters (CXM) 758, a communication address register (CAR) 754, a communication effective address register (CER) 760, a communication fetch register (CFR) 756, a communication store register (CSR) 752, a communication word counter (CWC) 750 and a parity checker 764. The clock is shown as a 20-megacycle clock in the communication unit 100 since the synchronization leads are placed there in one practical embodiment, but optionally, the clock could be placed elsewhere and could be at other frequencies. Also, the illustrative embodiment is shown as a synchronous machine, but the invention could also be incorporated in an asynchronous system. All information that is transmitted to memory 122 is first transferred to the communication store register 752. The output of communication store register 752 is directly connected to the transmitters 758. All information which is received from memory 122 appears in the communication fetch register 756. Communication fetch register 756 is driven directly by the receivers 762. All received information is also checked in the parity checker 764.

Memory addresses are sent to the communication unit address register 754. Some operations in the communication unit 100 are overlapped. For example, the last three words of a four-fetch may be received while the next transaction through memory 122 is being initiated. Because of such overlapping, it is necessary sometimes to remember the address of the last transaction while the current transaction is being initiated. This would be necessary, for example, if the last transaction missed its parity after the communication address register 754 received a new address. In order not to confuse the controls under this condition, the last address is saved in the effective address register 760. Since two transactions may be going on at once, two effective address registers EAR1 and EAR2 are provided for the eventuality that both accesses are defective. The communication word counter 750 counts one or four depending upon whether the fetch is a simple fetch or a four-fetch. The communication unit 100 either will perform a one-fetch or a four-fetch and this ability saves time. The buses to memory 122 may be made to carry parallelly 53 bits, 52 bits of data and 1 bit of sync. In one practical form of the illustrative embodiment, a four-fetch or four-store therefore takes four time periods in getting onto and off the bus. Using the 20-megacycle clock, a convenient period is two clock periods, or 100 nanoseconds per word, so that a four-word transfer occupies four-tenths of a microsecond. When only one word is needed, only one word is sent or received on the bus.

Not shown in FIG. 7 but implied there are leads carrying a multiplicity of commands to the communication unit, corresponding to a multiplicity of sources of addresses for the CAR 754. Among the possible sources of addresses are the instruction address from the instruction look-ahead 101, the address register 602 from ADVAST 104, the ADVAST index address register 603, the stack extension location pointer 504 at the stack 116 (see FIG. 5), the addresses from the address field portion 118 of a word in the storage queue STORQ, the address field portion 118 of a world in PRT area of associative memory, PRTQ, or the address field portion 118 of an index word in the index queue IDXQ also in associate memory 19 which must be stored back to memory 122. Corresponding with these sources of addresses are a multiplicity of commands for the communication unit 100. There are levels from instruction look-ahead 101 (FIG. 3), from stack extension 500 (FIG. 5), from storage queue STORQ of associative memory 19 (FIGS. 1 and 10), from ADVAST 104 (FIG. 6), from the index word area IDXQ of associative memory 19 (FIGS. 1 and 10), all asking for access to the communication unit 100. Referring back to FIG. 7, the communication unit 100 contains a logic network which decides among these levels. In fact, it gives a fixed priority order to the various levels which might be asking for access to the communication unit 100.

The priority is fixed by hardware wiring. If the advanced station 104 desires access to the communication unit 100 for a single fetch, it gets it. As so fixed, either the storage queue STORQ of associative memory 19 or the instruction look-ahead 101 is probably at the tail end of the priority list. Other commands which are separate commands to the communication unit 100 may be exercised by the dump registers instruction and the load registers instruction. The communication unit is shown in detail in FIG. 11.

The 20-megacycle clock in the system of which the invention may be a portion may be operated by a clock oscillator in each module. These clock oscillators are synchronized from a centralized master source, as contemplated in the illustrative embodiment, although asynchronous operation could be effected without departure from the invention taught herein. The centralized master source is contained in some modules, for example, the I/O control module. The clocks in all modules are synchronous with each other.

DETAILED DESCRIPTION OF THE COMMUNICATION UNIT

Now refer to FIG. 11. FIG. 11 is a schematic block representation of the communication unit 100 illustrated also in the simplified block diagram of FIG. 7, but the FIG. 11 showing is in detail. The communication unit 100 serves as the medium for communication between memory 122 and the portions, sections and units (and registers) within the system of the invention, which require access to and fetching from memory 122. These portions, sections and units (hereinafter called devices) comprise the store queue (STORQ) portion 120B and the index and program reference table portions (IDXQ/PRT) 120A of the associate memory 19 (see FIGS. 1 and 10), the stack extension 500 (see FIGS. 2 and 5), a jump control section 1101B and and an ADVAST control section 1101A, both of which comprise sections of the ADVAST control unit 1101 (see FIG. 10), the TEMP unit 114 (see FIGS. 1 and 2), and the instruction look-ahead unit 101 (see FIG. 1). A plurality of request flip-flops responsive to request for access to memory signals are provided, one request flip-flop being provided for each of these portions, sections and units. These flip-flops comprise respectively request flip-flop FF1101 responsive to the request signals from STORQ 210B, request flip-flop FF102 responsive to the request signals from IDXQ/PRTQ 120A, request flip-flop FF1103 responsive to the request signals from stack extension 500, request flip-flop FF1104 responsive to the request signals from jump control 1101B of ADVAST control 1101, request flip-flop FF1105 responsive to request signals from TEMP 114, request flip-flop FF1106 responsive to the request signals from ADVAST control section 1101A of the ADVAST control unit 1101, and request flip-flop FF1107 responsive to the request signals from instruction look-ahead 101. Setting of any one of these flip-flops by these output request signals initiates a request for access to memory 122. A priority resolver unit 1102 is provided which resolves priority in accordance with predetermined priority between the requesting devices STORQ 120B, IDXQ/PRTQ 120A stack extension 500, jump control 1101B, TEMP 114, ADVAST control section 1101 and instruction look-ahead 101. This priority resolver may, for example, be of the type discussed in the aforementioned patent application of Hopper et al. for "Switch Interlock." This priority is contemplated as being predeterminedly fixed. However, without departing from the spirit of the invention, a shifting or other priority could be incorporated and other types of priority resolvers could be utilized. At the outputs of the priority resolver unit 1102 are provided seven priority flip-flops FF1111, FF1112, FF1113, FF1114, FF1115, FF1116 and FF1117, each responsive to a corresponding request flip-flop and its corresponding requestor STORQ 20B, IDXQ/PRTQ 120A, stack extension 500, jump control 1101B, TEMP 114, ADVAST control section 1101A, and thus priority flip-flop F1111 is responsive to corresponding request flip-flop FF1101 and STORQ 120B, priority flip-flop FF1112 is responsive to corresponding request flip-flop FF1102 and IDXQ/PRTQ 120A; priority flip-flop FF1113 is responsive to corresponding request flip-flop 1103 and stack extension 500, etc. A plurality of selection gates responsive to the outputs of the seven priority flip-flops FF1101–FF1107 are provided, selection gates 1110, selection gates 1111, selection gates 1112 and selection gates 1113. Three, for example, selection gates units, selection gates 1110, selection gates 1111 and selection gates 1112, are provided to pass data. A fourth selection gates unit 1113 is provided to pass addresses. Selection gates 1110 comprise the first 22 bits of the first data word and selection gates 1111 comprise gates for the first 22 bits of data words 2, 3 and 4, selection gates 1112 will comprise gates for bits 23 to 51 of all data words. Selection gates 1113 comprise the gates for the 22 bits which may comprise an address in operating the computer system of the illustrative embodiment of the invention. The communication address register (CAR) 754 (see FIG. 7 and FIG. 10B) handles both addresses sent to memory 122 and the first section of the data word. The communication address register 754 is responsive to the selection gates unit 1110 and, but not simultaneously, to the output of the communication store register (CSR) 752 (see FIGS. 7 and 10) via a feedback path provided between the output of communication store register 752 and the input to the CAR register 754. The CSR register 752 may be thought of as comprising two halves, a first half adapted to contain bits 1 through 22 of the data word or its address, and the second half adapted to contain bits 23 through 51 of the data word. Bit 52 of the data word is assigned for the parity generator 764 (see FIG. 7). The addresses from selection gates 1113 are fed into the first half, bits 1 to 22 inclusive, of CSR register 752. Bits 23–51, which were stored in selection gates unit 1112, are presented to the second section, bits 23–51, of the CSR register 752.

A pair of effective address registers, EAR(1) and EAR(2), 1114 and 1115, are provided. The first EAR(1) register 1114 will store the address of a first request for access to memory from the selection address gates 1113 and the second EAR(2) register 1115 will store the address of the next succeeding request for access to memory from address selection gate 1113. The arrival of a third address of a request from the selection gates unit 1113 will displace the address from the first request placed in EAR(1) register 1114. The purpose of the EAR(1) and (2) registers 1114 and 1115 is to insure that the addresses will be retained so that if an error should occur the system will know what address in the program contained an error. As soon as any of the selection gates 1110, 1111, 1112 or 1113 are turned on, parity is checked in the parity generator 764, and 100 nanoseconds later the parity bit 52 in the CSR register 752 is accordingly set as the data or address is strobed into the CSR. A requestor determining unit 1117 is provided which may comprise 16 flip-flops. A decoder unit 1118 is provided to decode the address from selection gates 1113. The requestor unit 1117 flip-flops are responsive to the output of decoder unit 1118 to determine which memory module of memory 122 is being addressed. Accordingly, one of the 16 flip-flops of requestor unit 1117 corresponding to that memory module is set. A lead is provided between each of these 16 requestor unit 1117 flip-flops and a corresponding memory module. The illustrative embodiment thereby provides for 16 memory modules although a lesser or greater number may be used of course. A requestor strobe flip-flop 1119 is also provided. Simultaneously with the setting of fone of the flip-flops of requestor 1117, the requestor strobe flip-flop 1119 is set. Thus, when one of the 16 requestor flip-flops 1117 is set and the requestor strobe flip-flop 1119 which has lines going to all of the memory modules is set it enables the information in the CSR register 752 to be sent to that particular memory module of memory 122. As soon as CSR register 752 is loaded, drivers 758 (comprising the communication transmitters of FIG. 7) are also enabled and the information from the CSR register 752 is transferred to memory 122.

When information is derived from one of the memory modules of memory 122 it is first sent to receivers 762 (see FIG. 7). The receivers 762 standardize the incoming signals and transmit the standardized signals into the communication fetch register 756 (see FIG. 7). A processor fail register (PFR) 1120 is provided. From the receivers 762 the incoming data also goes through parity checker 764. If an error is present parity checker 764 will set a bit in the processor fail register (PFR) 1120. If an error is detected the parity check output error signal from parity check unit 764 will also enable the corresponding register of the EAR(1) and (2) registers 1114 and 1115.

CFR register 756 transmits the incoming data from memory 122 to the requesting device of requesting devices STORQ 120B, IDXQ/PRTQ 120A, stack extension 500, jump control 1101B, TEMP 114, ADVAST control 1101A or instruction look-ahead 101, that is, the one of these devices which has requested the information of memory 122.

It should be understood that although the words "data in" are employed in the FIG. 11 designation of each of the devices STORQ 120B, IDXQ/PRTQ 120A, stack 500, jump control 1101B, TEMP 114, ADVAST control 1101A, and instruction look-ahead 101, actually not all of these units have their own store corresponding to the data in, and the "data in" section may be considered as really a gate section. The jump control 1101B and ADVAST control 1101A, for example, are not provided with their own store, When data is received by ADVAST control 1101A, it is immediately gated through into the appropriate section in IDXQ/PRTQ 120A or the IWR register 630 (see FIG. 10). In some cases, alternatively, the ADVAST 104 will instruct that the second portion bits 30 to 48 in CFR register 756 be sent directly to an ADVAST memory address register (ASMA) 1064 which is provided (see FIG. 10) and used in several jump microsequences. If the information is presented to the jump control requestor 1101B, it gates the received data directly to the IDXQ/PRTQ 120A of associate memory 19. The remaining requestors, STORQ 120B, IDXQ/PRTQ 120A, stack extension 500, TEMP 114 and instruction look-ahead 101 have their own storage into which the information from memory 122 is received. An encoder 1121 may be provided which detects error signals and sets the proper interrupt condition register bit in an interrupt condition register which is provided for interrupts in the ADVAST unit 104. A remember unit 1122 is provided. Remember unit 1122 may comprise five remembrance flip-flops (not shown). The purpose of these five flip-flops is to remember which one of the five selected—stack extension 500, jump control 1101B, TEMP 114, ADVAST control 1101A, or instruction look-ahead 101—of the seven requestors has made the read request so that it can be insured that upon return of the information from memory 122 this information will be routed into the true requesting device.

The reason that a flip-flop need not be provided for the STORQ 120A and for the IDXQ/PRTQ 120B of the data portion 120 of associative memory 19 is that these portions do not have the function of receiving data nor its capability. That is, they only send data out to memory 122 and do not receive data from memory 122, by themselves. Of course, it should be remembered that the ADVAST control 1101A can send information and can receive information from memory 122 and store it in the IDXQ portion of data section 120 of associative memory 19. The STORQ portion 120 is filled from the stack extension 500.

Other systems may illustrate units which superficially resemble blocks which appear to correspond to applicants' address station, final station and final queue. However, the functions provided by applicants' units are not performed, in fact, by such units, and such systems process all instructions through their "final station" which cause such systems to have to straighten out jumps when they occur. This leads to situations wherein such other systems slow down the machine too much. In the system of the present invention there is provided an ADVAST 104, a FINQ 108 and a FINST 110 wherein instruction look-ahead 101 is separated (functionally, not necessarily mechanically) from the advance station 104 which allows the advance station 104 to run more efficiently.

In the system of the invention the advance station 104 is not allowed to perform any work which must be undone. Particularly, the advance station 104, upon sensing a jump instruction, will not execute any instructions until it knows which way the jump is to be taken and whether the jump is to be taken or not.

The functional separation of instruction look-ahead 101 from the advance station 104 is shown in the drawings. It is seen that instructions are fed into instruction look-ahead 101. The ADVAST 104 thus is decoding branches so that if there is a branch while the instructions are being processed in the instruction look-ahead 101 and syllable determination unit 102 this instruction involved in such branch is not permitted to be executed until it is known whether there is to be a branch and where the branch is going.

INSTRUCTIONS AND JUMP OPERATIONS

Now refer to FIG. 8 which comprises the constituent instruction formats of FIGS. 8A, 8B, 8C, 8D, 8E, 8F, 8G, 8H, 8J and 8K.

FIG. 8A illustrates the one-syllable instructions. The one-syllable instructions comprise the ordinary 6-bit long operation code or Opcode instructions. The one-syllable instructions which correspond to this format are as follows:

Stop, Fetch from Memory to Stack at Absolute Address of Zero, Store from Stack to Memory at Absolute Address of Zero, Complement, Or, and Imply, Exclusive OR (these last four are logical instructions; the next eight are arithmetic instructions), Round, Add, Subtract, Multiply, Divide, Normalize, Integer Divide, Make Integer, which Converts floating Point Representation of Numbers to Integer Representation of Numbers, Double Length Add, Double Length Subtract, Double Length Multiply, Double Length Divide, Add Magnitude, ignoring exponents, Subtract Magnitude (the next seven are miscellaneous instructions), Duplicate Top of Stack, Return from Subroutine, Return from Interrupt, Index by Top of Stack, Which Means Add Top of Stack to Address Register, No Operation, ADVAST Wait or FINQ Empty, Extract Tag Bits (to top of stack), Insert Tag Bits, from top of stack into second word in stack, and a second representation of Halt.

The two-syllable instructions shown in FIG. 8B comprise 6 bits for the Opcode and an additional 6 bits for a variant syllable. In the FIG. 8C type of two-syllable instructions the first six bits are the Opcode and the second six bits denote a numerical value. The two-syllable instructions are as follows: Of the type of FIG. 8B: rearrange top of stack, shift and jump, and an instruction for conversion between binary and decimal notation.

The two-syllable instructions of the type shown in FIG. 8C include: short literal, fetch from register to stack, store from stack to register, set barrel shift register, enter executive program, initiate input-output process, and interrupt computer module. The numerical field may represent respectively a number, a register address, a shift count, an entry point, and input/output module number, or a computer module number.

FIG. 8D illustrates the format of some of the address variant instructions. These instructions comprise four syllables. The first syllable of six bits includes the Opcode or operation code number for the instruction. Bits 5–8 are the variant bits. Bits 9–11 comprise three bits which designate a base register. The six bits from 12 to 17 and the six bits from 18 to 23 comprise the twelve bits of the address field which denote a two-syllable memory address. These instructions are as follows: Fetch from Memory to Stack, Fetch from Memory Conditional, Fetch from Memory to Address Register, Store from Stack to Memory, Fetch from Memory and Set Tag Bits, in Memory, While Fetching, Setup Jump, and Test and Modify Index Word.

FIG. 8E shows the instruction format for field defined operations. These are three syllables. The first six bits, bits 1 to 5 of the field defined operations are the Opcode. Bits 6 to 11 denote the size of the field by number of bits. Bits 12 to 17 denote the starting bit of the field. The field operations are as follows: Clear the Field, Set the Field to All Ones, Complement the Field, Extract the Field from a Word, Insert a Field from One Word into Another.

The instruction to test field adds a fourth syllable to the three shown in FIG. 8E. The fourth syllable is a variant syllable which describes the mode of testing. It occupies bit positions 18–23.

Other three-syllable instructions are illustrated in FIG. 8F. These instructions consist of an Opcode, bits 0 to 5, and an address field in the two syllables from bits 6 to 17. They comprise the instructions, Fetch Address to Top of Stack and Index.

FIG. 8G illustrates the format of the jump instructions. This is a special case of the two-syllable instructions shown in FIG. 8B. It is shown in more detail in separate FIG. 8G because of its similarities to the jump instructions of FIGS. 8H and 8J.

FIG. 8G shows six bits of Opcode followed by a variant syllable in which the bits have special significance as subdivisions of the variant. The six bits of variant syllables comprise a first bit which specifies whether the first word being compared is to be held or discarded. The second bit of the variant syllable specifies whether the second of the two words being compared is to be held or discarded. The remaining four bits specify four variations of the comparison process, for example, compare =, compare >, compare <, compare ≥, compare top of stack equal to zero, and so forth.

FIG. 8H illustrates the format for the instruction to jump on testing a field. The first six bits are the Opcode. The second 6-bit syllable has exactly the same significance as the variant syllable of the jump instruction, illustrated in FIG. 8G. The third syllable specifies the bit number of the starting position of the field. The fourth syllable specifies the size of the field, that is, the number of bits within the field.

FIG. 8J shows the format of the jump on testing an index instruction. The first 6-bit syllable contains the Opcode. The second 6-bit syllable is a variant specification. The last four bits of these six are identical with the last four bits of the other two jump instructions. However, the first two bits specify the manner in which the index word is to be modified after testing. The third and fourth syllables of this instruction contain a 12-bit address of the index word relative to the base index register 621 (FIG. 6).

FIG. 8K shows the format of the set-up jump instructions. The first syllable is the Opcode. The first syllable is a variant syllable. The first bit of the second syllable is not used. The second bit of the second syllable is an unconditional bit which specifies that the jump is to be taken without any test. The third bit of the second syllable is for the program reference table and specifies whether the address is of a PRT line (indirect jump) or is a PCR 106 setting (direct jump). The next three bits of the variant syllable are the syllable address of the instructions to be jumped to, if such a syllable address is applicable. The last two syllables of the instruction contain a 12-bit address field. If the third bit of the variant syllable is a zero the address field is to be taken with respect to the base program register 626 (FIG. 6). If the third variant syllable bit is a "one" the address field is the address of the line in the program reference table which will specify jump.

It will be understood, of course, that certain descriptors are also included in the instruction format of the other modules of the system being described. For example, one or both of the memory module and/or the input/output control module may be capable of generating and executing certain instructions. Additionally, some of the instructions which are introduced into the processor of this invention are generated by virtue of the instructions originally executed by the executive and control program.

Now refer to FIG. 9. FIG. 9 shows the format of certain words stored internally in the machine in the form of descriptors, which can be found in the program reference table or at the address zero of the base index register 621. FIG. 9 comprises FIGS. 9A, 9B and 9C. FIG. 9A illustrates the format of the return information which is held at the head of every program reference table; these constitute word "zero" and word "one" of every program reference table. The first two words in each PRT contain return information whereby the segment currently being executed can return to the segment which called it. However, some program reference tables are the Master Program Reference Tables for their particular jobs and may contain other information.

The first of these first two words contains the address of the old program reference table, the program reference table of the calling program segment. It also contains the size of the old program reference table in order that any reference to the old program reference table will in fact fall within the old program reference table. The size is held as a program reference table limit field, in addition to which the three tag bits of this first word may be coded "bounds" so that references through the old program reference table can be made to data which is pointed out by the old program reference table without the necessity for recopying those references into the present program reference table. This is exactly the format of those words in the program reference table which point out segments of data. In this case the segment of data pointed out is the old program reference table belonging to the calling program segment. Also, within the first word are 12 bits which are reserved for executive program use. They contain at least one bit which specifies that the old program reference table is a "read only" object and must not be written into.

The second word of the program reference table contains information about its own program segment. It contains the address field at which the segment starts, the base program register setting for executing this program segment. It contains its own size, program reference table limit. Both these fields are 18 bits long. The tag bit field is set to the "empty" configuration. In addition to the 36 bits of the two fields, address of program segments, and program reference table size, there are 12 bits which are reserved for the executive program's use.

FIG. 9B illustrates the format of the jump control words which are imbedded within the PRT in order to effect transfer of control to new program segments or to portions of code within the existing program segments. The jump control word is an entry in the program reference table. Reference to a particular line of the program reference table containing a jump control word will result in the program executing jumping as specified by the jump control word. The first three bits of the jump control word contain the jump type. The types of jump which are described in the jump control word include a non-return jump in which control is merely transferred to another program segment, an internal segment jump in which a jump return word is set of which mention will be made hereinafter and in which the code being jumped to is within the same segment as the following segment, a segment jump which is the same as an internal segment jump except the code being executed is in a new program segment, and lastly, the procedure jump which in addition to setting up the jump return word for return information and jumping to a new program segment, also establishes a new program reference table for the procedure. In this last case the entry will be at the heading of the new reference table which contains the address of the program segment to be jumped to. Other portions of this specification have indicated that the program reference table contains pointers which point out various segments of code and various data objects. The jump control words are the pointers which point out other segments of code. The second 12 bits contain an increment for the base index register 621 setting to give the routine being jumped to fresh working area, fresh index words, and a jump return word which will be stored at the base index register address at zero. The next 15 bits of the jump control word are a relative program counter setting. The first 12 bits are to be added to the base program register 626 to get the effective address to be jumped to; the last three bits are a syllable address within the word just found. The next 18 bits of the jump control word constitute an address field. For those jump types which call for a new program reference table this would be the address field of the new program reference table. In those jump types which do not call for a new program reference table this address field will be the address field of the base program register 626. In those jump types which neither change the base program register 626 nor call for a new program reference table the bits are not used. The last three bits are the tag bits. They contain the three-bit code which signifies that this is a jump control word. This code is decoded by the central processor module to indicate that it should be such a jump. If the segment to be jumped to is stored, not in main memory, but elsewhere, disc file for example, the tag bits call for an interrupt to the executive program.

In addition to the information stored in the program reference table, information which controls the return from jumps in the processor module is stored in the jump return word. The jump return word is always found at address zero relative to the base index register 621. The first three bits of the jump return word specify the jump type and indicate whether a return to an old program reference table or a resetting of the base program register 626 is needed. The next 12 bits contain a base index register decrement and are set from the base index register increment of the jump control word. Each level of subroutine upon entry increments the base index register 621, in response to the increment stored in the jump control word. Upon return from subroutine the base index register 621 is decremented according to the decrement found in the jump return word. Since the jump return word is stored at the location pointed to by the base index register 621, each decrementing of the base index register 621 results in the basing at the previous return word. A whole sequence of return words will run right up the ladder of return until one reaches the first level.

The next fifteen bits are a program counter setting. This is a relative setting and must be added to the base program register 626 in order to obtain absolute address for setting the program counter 106. The last eighteen bits constitute an address field which contains the old base program register setting, if applicable. In the case of those procedure jumps which call for a new program reference table, the old BPR settings will not be used. The feed tag bits are tagged empty.

OPERATION

(*I*) *Loading the machine*

On initial start-up of the system with which the processor of this invention may be employed the executive program must be loaded into main memory without the processor module doing anything that interferes with the process. Once the executive program has been loaded in main memory and it is in control, the job table within the executive program will control the assignments of processors to specific program executions. This is true even though there may be no other program segments in the processor, since in that case the job table will be completely empty and the executive program will continually look at the job table to find something to do. Initially the processor is disabled by means of a manual switch. A single descriptor is permanently wired into the I/O module. This descriptor causes the transfer from a specified external peripheral device to a specified memory location of whatever data is on that device. This data loaded into the external device is the executive program and the wired-in descriptor in the memory module causes the executive program, or a sufficient subset of it to enable the program to be self sufficient to be loaded into the memory.

The routine so loaded may consist of a bootstrap loading routine which calls for the main executive from where it is normally stored, probably on disc. The I/O control module starts executing its descriptors whenever the suitable descriptor is contained in the I/O module and whenever a flag is raised from the peripheral device indicating that the data is ready to be entered. Therefore, after stepping this prewired descriptor into the proper channel in the I/O control module, it will be necessary to push the start button on the peripheral device in order to raise the flag so that the I/O can service it.

The flag signal from the peripheral device causes the descriptor, in the I/O module just loaded, to be examined. The descriptor causes the transfer of data from the peripheral device to the specified memory location.

The processor now must have a setting of the base interrupt address register 624 which coincides with the location in memory 122 to switch the data that has been inserted. The base interrupt address register 624 is loaded manually if necessary, to a value corresponding to the address to which the portion of the executive program has just been loaded from the peripheral device. The processor disabling switch (not illustrated) is then turned off. The act of turning power on in the processor has caused the interrupt register to set a start up interrupt bit. This causes interupt to a specific location with respect to the base interrupt in the address register. Control is passed to the location which contains the program which has just been loaded to the I/O control module. At this point the machine is operating under executive program control and start up procedure is finished.

The executive control program allocates jobs according to entries in the job table, it allocates memory 122, according to data objects and program segments which are called for by the entries of the job table. It allocates disc space. It controls all transfers of data from the peripheral devices to memory 122 and from memory 122 to the peripheral devices. Thus, in taking over, the executive program causes all necessaries, all data objects, all constants and variables to be transmitted into the appropriate memory location designated so that object programs later inserted into the memory 122 which are to be run will have the necessaries available at the time when the object program needs them.

(*II*) *In-process operation of the computer*

Usually the executive program will expect to find the necessary items for a given program execution either in main memory 122 or on a disc. Inputs from the outside world are handled almost independently by the I/O control module. The programmer for example, when putting a deck of input information, either program or data, on a card reader and causing the deck of cards to be read from the card reader, will not in general cause any action on the part of the central processor immediately. The I/O control module, and its controlling descriptors sequence, will cause the deck information to pass from the card reader to a staging area on, for example, a disc storage system, without interrupt of the central processor except possibly at the end of the procedure to indicate that a program deck has been completely filed away on disc ready for action.

The executive program will examine the first of several card images retrieved from the staging area, so-called "header" cards, on disc to determine what shall be done to the program, whether to file or debug only, compile and go, transfer to library, or whatever. After determining what is to be done with the given program the executive program will enter this information in the job table.

At some future time when current jobs have left processor capacity idle, for example when some job entered in the job table is finished, the entry in the job table will be up-dated to a current job status. At this point the procedure of readying the necessary program segments, data blocks and program reference tables is very similar to that described in the above-mentioned and incorporated U.S. patent application Ser. No. 246,855 of Anderson et al. for Modular Computer System. The program reference table of the present application performs a function similar to that the adapter block of the reference.

At this point the program segments and necessary data objects are readied, that is, they are brought into main memory 122, and lines in the program reference table are furnished with the addresses in memory 122 which indicate the various objects which will be used by the program. At this point the processor program counter 106 is set to the first instruction of the main segment of the program code and a return from interrupt instruction executed. This results in the setting of the flip-flops of the processor to initial conditions and the first program step is executed.

At this point some lines in the program reference table indicate data objects or program segments which were indicated as "necessary" on the header cards which have been brought into main memory 122. If the execution of the program refers other PRT lines for data objects which are not present, computer operation will be interrupted. This interrupt will be caused by the interrupt tag bits of program reference table lines which refer to objects not present. The executive routine will then attempt to allocate memory space for the object which is needed, and if such space can be found the object will be brought in and control passed back to the program which called for it.

This procedure will continue with objects being brought in as necessary until the completion of the program is signalled by an appropriate call on the executive routine. At this time all space which has been occupied by the program just discussed is declared vacant, except for such objects and program segments as are being used by more than one program, and with which the other program or programs are not yet through.

*(III) Processing of instructions leaving computer*

By way of example the progress will be followed of a simple sequence of program steps which are assumed stored in the memory module 122 some place until their execution in the processor module. As an example consider a program sequence to multiply X by Y, add W to the result and store the result in the address assigned to variable Z. This may be represented by the equation:

$$Z=XY+W$$

In Polish notation the equation would read:

$$XY \cdot W+Z=$$

For an explanation of Polish notation refer to the aforementioned copending patent application Ser. No. 84,156 of Paul D. King et al., filed Jan. 23, 1961 for "Digital Computer."

The instruction string to execute this equation could consist of the following instructions and sequence:

FMA, this instruction will fetch one line of the PRT. Said line of the PRT will contain the address of the beginning of an array of data, symbolized X. The address field is transferred to the address register 602 (FIG. 6). (FMA is mnemonic for fetch from memory to address register.)

INDEX, an instruction to fetch an index word, whose contents are to be added to the address register 602 to indicate a particular item, one of the items of data in the array of data X;

FMS, an instruction to fetch a word from memory to the top of stack. The detailed operation of this instruction is followed below, in the description of the response of the illustrative embodiment of the subject invention to this example program sequence. It results in an item of data, symbolized X, being placed on the top of the stack, using the current contents of the address register 602 as indication of where in memory 122 the data is to be found;

FMA, used to indicate to call from the program reference table the base address of an array of objects Y;

INDEX, if necessary;

FMS, for a specific data word Y;

MULTIPLY;

FMA, this FMA is used to obtain the base index of an array of objects W;

INDEX;

FMS;

ABD;

FMA, this FMA refers to the PRT line which indicates an array of objects named Z; for simplicity assume only a single object in the array, so that indexing is not required;

SSM, store from stack to memory.

The sequence of programmed steps corresponds to the Polish notation in the equation above as follows: Fetching, using the subsequence FMA, possible indexing, and FMS corresponds to the occurrence of a single variable. This fetching subsequence occurs once for X, and once for Y. The instruction to Multiply corresponds to the multiply symbol. The subsequence occur again for W, followed by an instruction to ADD. A slightly different subsequence causes the result produced in the top of the stack to be stored back to memory at a location symbolized by Z. This slightly different subsequence is FMA, possible Index, SSM.

These instructions are assumed stored in the memory 122 at some point in the procedure, At some point in the execution of the program within which these instructions are embedded, the instruction look-ahead register 304 (FIG. 3) will cause these instructions to be fetched from memory and placed in instruction look-ahead 101. At some later time, the first FMA instruction will be extracted by syllable determination unit 102 and placed in the advanced station 104. At the conclusion of each execution of each instruction at the advance station 104 the next instruction in the string will be called from instruction look ahead 101 by syllable determination 102 and placed in the advance station 104. The execution of the instructions as they are pulled one by one to the advance station 104 therefore will be followed.

The first FMA is decoded by the advance station 104 and an address issued to memory 122. This address may obtain its data from the data section 120 of associative memory 19 if the item X has recently been referred to. Otherwise, the program reference table line is fetched from memory 122 and one of the two 18-bit address fields contained in that line is placed in the AAR 602. If the tag bit portion of the PRT line has been set to the bounds code by the executive program, then the two address fields of the PRT line are placed in the alternate bounds registers ABL 1027 and ABU 1028 (FIG. 10) to serve as the limits for the next subsequent fetch to memory. The first instruction is completely executed at the advance station 104 and causes no instruction to be entered into the final queue 108.

At the completion of the execution of the first instruction syllable determination 102 has by now placed the second instruction, an index instruction, in the advance station 104. The decoding of an index instruction causes the computation of the address of an index word. The index word may be found in associative memory 19 just as was the PRT line. If not, the index word is fetched from memory 122. The content of the index word is added to the previous content of the address register 602 (FIG. 6). This completes the action called for by the index instruction and the index instruction results in no entry to the final queue 108.

The third instruction is fetch from memory to stack. The contents of the address register 602, which by now are the sum of the address field of the PRT line and the address field of the index word, are added to an address content of the FMS instruction, if any, and sent to memory 122 as an address. Inserted into the final queue 108 is an instruction to fetch from temporary storage to the top of the stack. The location in temporary storage 114 is furnished to the communication unit 100 together with the address which has been manufactured. Communication unit 100 will receive the address from the advance station 104 and cause that address to be sent to memory 122. When data is received from memory 122 the communications unit 100 will cause that data to be inserted into temporary storage 114 at the location that has been indicated to the communication unit 100. The location in temporary storage 114 which was sent to communication unit 100 corresponds to the location in final queue 108 which contains the instruction, Transfer from Temporary Storage to Top of Stack. When this instruction reaches the bottom of the final queue 108 the location in temporary storage 114 will contain the data that has been fetched from memory 122.

The next instruction in order is an FMA. Just like the previous FMA, it transfers from the program reference table an address to the address register 602 of the advanced station 104. The next instruction is an index instruction which adds the contents of an index word to the address register (AAR) 602. The next instruction is an FMS which inserts into the final queue 108 a transfer from temporary storage to top of stack, as well as sending to the communications unit 100 an address in memory 122 and a location in temporary storage 114. At this point the final queue 108 will contain two instructions to transfer from temporary storage to top of stack, one right after the other. When two temporary storage 114 locations have been assigned at least one of them contains data which the communication unit 100 has fetched from memory 122. Only one temporary storage location will be empty at any given time. Communication unit 100 must fill one before it accepts instructions to fill the other, there being only one communication unit 100.

At any time when the final station 110 is through executing an instruction it may extract any instruction from the final queue 108 and execute that instruction. In the present case the final station 110 may execute these instructions to transfer from temporary storage to top of stack as soon as the temporary storage 114 is filled or it may wait some time because of previous instructions in the final queue 108 which the final station 110 has not executed. There is no necessary time relationship between the time of the advanced station 104 finishing the instruction and the final station 110 picking up that instruction, to execute it.

Meanwhile, at the advanced station 104, a multiply instruction has been decoded. The multiply instruction does not concern the advanced station 104 and is transferred unchanged into the final queue 108 as a third entry.

The next three instructions consist of an FMA, Index, FMS sequence similar to that which has already been discussed hereinbefore. The result is an instruction in the final queue 108 to transfer from temporary storage to top of stack. The next instruction is an ADD instruction. The add instruction is decoded at the advanced station 104. It is detected that no action is required at the advanced station 104, and the add instruction is transferred bodily as the fifth entry in the final queue 108.

The next instruction is an FMA instruction, which fetches an address from a program reference table. It may be followed by an index instruction which may add an index variation to the address 620 obtained from program reference table, and which is held in the advanced station address register AAR 602.

The next instruction is a store from stack to memory instruction. The store from stack to memory instruction causes the address just manufactured in the advanced station address register 602 to be transferred to the address section 118 of the next empty slot of the storage queue STORQ. The next item to be transferred to the final station 110 is a command to store to the storage queue together with an indication of which one of the four slots in the storage queue STORQ 120B has been assigned to this particular storage operation.

At this point the following instructions in the following order have been inserted into the final queue 108: Transfer from Temporary Storage to Top of Stack (this is variable X); Transfer from Temporary Storage to Top of Stack (this is variable Y); Multiply; Transfer from Temporary Storage to Top of Stack (this is variable W); Add; Transfer from Top of Stack to Storage Queue. This sequence of instructions and operands which has been issued to the final queue 108 and temporary storage 114 corresponds very closely to the sequence of operators and operand in the Polish notation equation in the example above. The only lack of correspondence is that the Variable Z is not specified in the temporary storage 114; the variable Z is specified in the address field associated with the storage queue 120B.

The final station 110 will execute these sequenced instructions in the order in which it comes to them. It is not important how many instructions are in the final queue 108 at the time the final station 110 executes them. The final station 110 may execute the instructions as fast as the advanced station 104 issues them, if it can, or the final station 110 may be quite a distance behind the advanced station 104. There is no necessary timing relationship between the two.

To investigate the advantageous behavior of the machine of the illustrative embodiment of this invention, upon the jumps, consider what will happen if the instruction following the store instruction were a jump to another portion of the same program code. The instruction following the SSM, which will be found at the advanced station 104, will be a jump instruction in this case. Such a jump instruction would be decoded; it would for example be a set up jump intsruction with the unconditional bit set to cause an unconditional jump. At the advanced station 104 the unconditional jump variant of the setup jump instruction would cause the program counter 106 to be set to the new value which was described in the setup jump instruction. The advanced station 104, therefore, would be executing program steps which would be obtained from the new program segment. In this case the presence of an unconditional jump in the program string has indicated to the advanced station 104 that the jump would be taken no matter what happens to the final station 110, and it is therefore proper to take the jump in spite of the fact that the final station 110 has not yet finished with those computations which preceded the jump. The final station 110 will of course finish the necessary computations as the final queue 108 empties.

On the other hand, if the action at this point in the program sequence had been not to store the result Z, but to test the result Z to see whether it was positive or negative, and the jumping had been made conditional upon this test, then the advance station 104 would not have proceeded. The advance station 104 would have decoded at some time, a set up jump instruction to determine to what location it must go. The next instruction decoded by the advance station 104 would have been a jump, or "test," instruction. The jump instruction would have specified a particular test on the result Z, for example, test for Z greater than zero. In this case the advance station 104 would hold up, and wait for the final queue 108 to become empty, only at which time would the advance station 104 know the desired result had been produced at the final station 110. At this time the test would be the next item passed from final queue 108 to final station 110, and would proceed, using the comparison circuit 230 of the final station 110. The advance station 104 would then execute the jump in accordance with the results of the test. If the jump were taken it would be necessary to fetch additional instructions to the instruction look-ahead 101. The new setting of the instruction address pointer, the instruction look-ahead register 304, would be found from the jump control register 1090 (FIG. 10). The address in the jump control register (JCR) 1090 would be transferred to the instruction look-ahead register 304 in order that the instructions to which the program is jumping could be fetched to the look-ahead 101. Once fetched to instruction look-ahead 101 the normal operation of the syllable determination 102 will see to that the instruction which is jumped to will enter the advance station 104.

The instruction look-ahead 101 may have fetched some instructions past the instruction which specified the jump, which are never going to be executed. This fetching of instructions is harmless, in the sense that no data or no program string has been changed.

Those conditions which cause the advance station 104 to stop are always specifically indicated by specific opcodes. These are the conditional jump, and jump on test for field, and a special instruction to empty final queue without any jump. For any other opcode the advance station 104 will continue after completing the current instruction. On these three opcodes the advance station 104 stops until the final queue 108 is empty, knowing that at the time the final queue 108 is empty whatever previous result has been called for in the program string must by now have been computed at the top of the stack 501.

To return to the previous form of the example, a set of instructions has been arranged in the final queue 108 constituting transfer from temporary storage to top of stack, transfer from temporary storage to top of stack, multiply, transfer from temporary storage to top of stack, add, and transfer to storage queue. The first instructions "Transfer from Temporary Storage to Top of Stack," causes a value, named X, to be transferred from temporary storage 104 to top of stack 501. The next transfer from temporary storage to top of stack causes a value Y to be inserted at the top of stack 501, and a value X to be pushed down to the second position of the stack 502. The multiply causes the top two members T501 and S502 of the stack 116 to be multiplied together and the result placed in the top of the stack 501. At this time the top of the stack 501 contains the product XY. The next instruction is transfer from temporary storage to top of stack which causes a value W to be transferred to the top of stack 501, and the already computed product to be placed down in second register 502. The next instruction, Add, causes the top two in the stack in registers 501 and 502 to be added together. In this case W is added to the product of XY, the product being in the second register 502 in the stack 516. The two numbers which are added together are individually destroyed; only the sum is saved. At this point the result is in the top of the stack; it is the only number in the stack 516.

The next instruction, the last instruction in the example to be placed in the final queue 108, is Store; it causes the result which is now in the top of the stack to be transferred to the data section 120 of the storage queue (STORQ) 120B of associative memory 19. At some later time, the communications unit 100 will respond to the signal from the storage queue 120B, saying that the storage queue has data to be stored, and will cause the result which is now in the storage queue 120B to be transferred back to the memory module 122.

In setting forth the structure, operation and procedure of the means and method of this invention, it may be helpful additionally to the introductory statement of this invention to now provide a summary of some of the salient features of the processor and the functional stations of the invention.

SYSTEM CHARACTERISTICS AND FEATURES

The illustrative embodiment of the invention presented herein describes a central processor which is employable as the high speed computation center of a complex data processing system. The means and method of the invention enables performance of functions comprising the execution of arithmetic calculations, control functions, data transfers and interrupt services and with the processor of the invention these may be performed under the direction of an executive and scheduling program. The system and method of the invention enables performing of concurrent operations. The inventive system provides for employment of sufficient interstation buffering to effectively mask many time consuming tasks such as instruction and operand fetches. As exemplified in the illustrative embodiment the central processor of the invention may comprise three functional stations: a communications unit, an advance station and a final station. These three stations are substantially operationally independent.

THE COMMUNICATION UNIT

The communications unit of the processor of the invention as described in the illustrative embodiment, controls and executes all references to main memory by the central processor. The communications unit 100 monitors the various units within the advanced station 104 and the final station 110 which periodically require access to main memory. The communication unit may service four units within the central processor, the stack extension unit 500, the temporary queue 114, the instruction look-ahead unit 101 and the local associative memory 19. The local associative memory 19 may comprise the store queue, the index queue and the program reference table queue. The stack extension 500 is in the final station 110 and may be serviced on a "need" basis. The communication unit 100 monitors its contents and automatically executes store or fetch operations in order to maintain a certain predetermined number of operands for use by the final station 110. Temporary queue 114 is also in the final station 110 and may be serviced by the communication unit 100 on a "demand" basis. The advanced station 104 may initiate all requests for service to the temporary queue 114. The instruction look-ahead 101 may be a unit which is separated physically or optionally it may be actually physically located in the advanced station 104 and instruction look-ahead 101 may be serviced on a "need" basis. The communication unit 100 monitors instruction look-ahead 101 similar to the way it monitors stack extension 500, but in the case of instruction look-ahead 101, service is a one-way routine since there is never a need to store from instruction look-ahead 101. The storage queue of associative memory 19 is in the advanced station 104 in the illustrative embodiment and is continuously monitored by the communications unit 100 and serviced on a "need" basis. The storage queue requires store only service and the communications unit 100 will store data from the storage queue to main memory 122 periodically in order to keep it available for use by the final station 110. The index queue and program reference table queue portions of associative memory 19 may be serviced on both "demand" and "need." Any fetch reference made to the main memory 122 by the central processor that is relative to the base index register 621 or the program reference table is placed in the associative memory 19 by the communications unit 100. If the index queue/program reference table queue of associative memory 19 is full at the time, the communication unit 100 will remove the oldest piece of data in the queue and return it to main memory 122.

Other functions of the communication unit 100 may be the generation of parity on outgoing addresses and data, the checking of parity on incoming data, and continuous monitoring of interrupt lines from memory modules I/O control modules, and other central processor modules. The communications unit 100 may comprise the receivers 762 (to receive and standardize signals to processor from memory and I/O control modules) and transmitters 758 for inter-module communication (the drivers supplying power drive to signal lines from processor to memory and I/O control modules), the communication address register 754 for address buffering, the communication store register 752 for buffering of Write data, the communication fetch register 756 which buffers and acts as a distribution center for incoming data, and the communication control system (FIG. 11) which performs the service monitoring, the priority and conflict resolution, and the control of all processor to main memory operations.

The control processor module may interface with the main memory and I/O control modules by means of the communication unit 100. The communications unit may coordinate the transfer of information between the processor module and the main memory and I/O control modules. It may provide timing and controls which direct sequential operations required by the communications process.

THE ADVANCED STATION

The advanced station 104 is the program processing portion of the central processor. All advanced station 104 operations begin at the instruction look-ahead 101. The instruction look-ahead comprises a local memory unit used for buffering instruction words of the current program much in advanve of their use. The capacity of the instruction look-ahead 101 may be 12 words at 52 bits per word. Since the longest instruction of the illustrative embodiment contains four, 6-bit syllables, the minimum buffering available is for 24 instructions. With this amount of "look-ahead" it is not difficult for the communication unit 100 to keep the instruction look-ahead 101 sufficiently ahead of actual advanced station 104 computation, thus masking the time taken in fetching program words.

Instructions are taken from the instruction look-ahead 101 in sequence and placed in the ADVAST instruction register 604. The ADVAST instruction register 604 holds the current opcode (operation code) syllable and associated variant and/or the address syllables. The operation and variant syllables are decoded by the ADVAST control 1101 to determine what operations are to be performed, if any, by the advanced station 104. The combination of opcode and variant determine if there is address arithmetic to be performed; and, if so, what base register is to be applied and what limits are to be employed in the memory bounds check in the ADVAST comparator unit. If the instructions involve an address computation which results in a memory reference, the address is checked against memory bounds in the ADVAST comparator unit and any violation will cause an interrupt. The address is also presented to the associative memory 19 to determine if the word requested is stored locally in its storage queue. index queue or program reference table queue. If the requested word is not in local memory, the address is passed on to the communication address register 754 along with control information telling the communications unit 100 where to place the contents of this address when it arrives from memory; therefore, if the word is intended for the final station 110, the advanced station 104 need not wait for the fetch to be completed.

Once having initiated the communications unit 100, the advance station 104 is free to move on to the next instruction. If the requested address is one stored locally, the action of the associative memory 19 automatically cycles the local queue and the requested word appears at the output. If the requested word is to be used by the advance station 104, it is available for computation at the queue output; and if it is intended for the final station 110, the advance station 104 transfers the word to temporary storage 114 which is the final station's local operand queue. The advanced station adder 601 may be a three-input adder which enables one pass addition of the address syllables in the instruction string, a base register and an index amount. Indexing is applied to address computation by means of the ADVAST address register 602. The ADVAST address register 602 is the accumulator for index arithmetic. The local QUEUE in associative memory 19 may contain up to 24 index words, thus enabling a good portion of all indexing to be accomplished without references to main memory.

The program reference table queue of associative memory 19 is the local storage for the most recent program reference table relative references to main memory 122. This provides a local storage for control words used in program jumps, words containing alternate memory address bounds, and words containing indirect addresses. The execution of all program jumps is controlled by the advanced station 104. The sequences for the various types of jumps are described hereinabove in this specification. The initializing of the jump control register 1090 is accomplished by the advanced station 104 as is the distribution of the jump control word and the formation of the return control word. The advanced station 104 also senses all interrupt conditions, responds to specific interrupt situations and controls the preliminary interrupt processing sequences.

All instructions executed in the central processor of the illustrative embodiment of the invention are handled by the advanced station 104. Those instructions which are strictly final station 110 operations are simply decoded by the advanced station 104 and transferred to the final station 110.

THE FINAL STATION

The final station 110 is that portion of the central processor which performs arithmetic and logical operations and all stack and stack test operation. All final station operations are initiated by instructions taken in sequence from the final queue 108.

As the advanced station 104 completes the pre-processing of final station instructions, it places the opcode in a final queue 108 and the associated variant syllables or locally stored operand in the temporary queue 114. If an operand is involved which must come from main memory 122, the advanced station 104 presents the communication unit 100 with a temporary queue address where the communication unit 100 will place the operand when it arrives. All final station operations involve the stack extension 500 and particularly the first two positions which are hard registers, T register 501 and S register 502.

The final station 110 includes a comparator 230 which is used for all stack and field testing and is also used for some logical functions such as "IMP" and "OR" and some field manipulations such as "clear field" and "complement field." The "ones detector" is used for normalization, and conversion from integer to floating. It is also used in stack and field testing against zero. The adder 220 is used for arithmetic operations only. Shifts and field manipulation are accomplished through the high speed barrel shift mechanism.

The final station 110 is actually under the control of the advance station 104 but cannot be stopped as long as there are instructions in final queue 108. A special instruction does exist which halts the final station 110 when it appears at the top of the final queue 108. The final queue 108 is allowed to empty on all processor interrupts before any of the interrupt service routines begin. All data stores to main memory 122 are accomplished from the top of the stack 501. On the command of a store stack to memory instruction, the final station 110 will transfer the contents of the T register 501 to the storage queue in associative memory 19. The final station 110 is dependent on the advanced station 104 and the communication unit 100 only to the extent that to be operating there must be something in the final queue 108 and the temporary storage 114. As long as there is a queue of final station instructions, the final station 110 does not have to wait on the advance station 104 or the communication unit 100.

TIMING CRITERIA

Although this invention is not to be limited thereto, in the illustrative embodiment, for example, there are three execution times specified for each instruction: one for the advance station 104, one for the communication unit 100, and one for the final station 110. The advance station 104 computes addresses, does indexing and index tests. The communication station 100 provides communication between a computer module and the memory modules, and the final station 110 processes data and makes tests on data.

All instructions are processed by the advance station 104 where the instruction decoding also takes place. Some instructions are also processed by one or both of the communication station 100 and the final station 110. These stations may be buffered so they can operate as if they were independent of each other. For example, when the ADD instruction is processed by the advance station 104, it is put into the final queue 108 where it waits to be processed by the final station 110. This permits the advance station 104 to begin processing the next instruction without waiting for the final station 110 to become available. The communication station 100 may also be buffered in this way, and as long as the buffers are not full, the stations are independent and can operate concurrently.

The execution time for a sequence of instructions may be approximated by separately summing the times for each station and then choosing the largest of these three sums.

A few instructions may require two stations at the same time, and independence between stations may not hold for these instructions. For example, an index instruction referring to an index word for the first time (not in local memory) may require the advance station 104 to wait until the communication unit 100 has obtained the index word before the advance station 104 can proceed with the index arithmetic.

The time required for the communication unit 100 to fetch instruction words is not charged as time involved in each instruction since the communication unit 100 is capable of fetching instruction words far in advance of their use in the advance station 104. These instruction words are fetched to the instruction look-ahead 101 during periods that the other stations in the processor are not using the communication unit 100.

The following glossary of the abbreviations of terms used in the drawings and the foregoing specification is provided for convenience:

GLOSSARY

AAR—ADVAST Address Register.
AAU—ADVAST Adder Unit.
ABL—Alternate Bounds Upper.
ABU—Alternate Bounds Lower.
ACCESS—Level Indicating Memory Access Made.
AIR—ADVAST Instruction Register.

GLOSSARY—Continued

ASM—Associate Memory Address Checking Matrix.
ASMA—Associate Memory Address Register (copy of AAR).
BDR—Base Data Register.
BIAR 1 & 2—Base Interrupt Address Registers.
BPR—Base Program Register.
BSR—Barrel Shift Register.
BXR—Base Index Register.
CAR—Communication Address Register.
CFR—Comm. Fetch Register.
CSR—Communication Storage Register.
DRVRS—Drivers to Memory or I/O.
EAR 1—Effective Address 1.
EAR 2—Effective Address 2.
EAR 1 I.G.—Input Gates for EAR 1.
EAR 2 I.G.—Input Gates for EAR 2.
(Two required because of speed. One saved until interrupt could occur.)
ERROR—Parity Error Signal from Memory (or no access to memory).
FINQ—Finish Station Queue (queue of inst).
ICR—Interrupt Condition Register.
IDXL—Index Limit.
IDXQ—Queue of BXR Relative References.
IDXV—Index Value or Contents.
IG—Input Gate.
ILA Odd—Instruction Look Ahead 4 word block Odd.
ILA Even—Instruction Look Ahead 4 word block Even.
IMR—Interrupt Mask Register.
INPUT 1—Input Register for ADVAST Adder for Base Registers.
INPUT 2—Input Register for ADVAST Adder for Address Parts.
INPUT 3—Input Register for ADVAST Adder for AAR & Top of Stack.
JCR—Jump Control Register.
NBL—Normal Bounds Lower.
NBU—Normal Bounds Upper.
P—Extension of Top of Stack.
PCR—Program Control Register.
PFR—Processor Fail Register.
PRT—Program Reference Table Base Register.
PRTL—P.R.T. Limit Register (PRT Upper Bounds).
PRTQ—Queue of PRT Relative References.
RCVRS—Receivers from Memory to Comm.
REQN—Signal tailored to specific Memory Module.
REQSTB—Strobe to all Memory.
RTB—Register Transfer Bus.
S—Second of Stack.
SLP—Stack Load Pointer.
S.S.C.—Syllable Selection Controller.
$STK_A$—4 word Top Extension of Stack.
$STK_B$—4 word Next Extension of Stack.
$STK_C$—4 word Last Extension of Stack.
STORQ—Queue of Most Recent Stores.
T—Top of Stack.
TEMP—Temporary (Data for Finq) Storage.

It can be appreciated that the invention embodies features of true look-ahead, parallel processing within the processor by separating the processing functions and providing paths therefor, dynamic memory bounds, variable stack length thereby saving wasteful use of communication lines to memory, stack extension, automatic means for effecting several classes of indirect jumps and affords the many other features and advantages referred to hereinabove.

Obviously many modifications and advantages of the present invention are possible in the light of the above teachings. It is therefore to be understood that within the scope of the appended claims the invention may be practiced otherwise than as specifically described. It is accordingly intended in the appended claims to claim all such variations as fall within the true spirit of the invention.

What is claimed is:

1. A processor to provide processing of present and anticipated instructions, said processor comprising:
(a) an instruction executing final station means,
(b) means for processing instructions prior to their arrival at said final station,
(c) means for determining before execution of an instruction whether a branch or other occurrence will be effected which would make preprocessing steps and manipulation of data undesirable to be executed, and
(d) means responsive to said determining means for preventing further preprocessing by said prior processing means.

2. The processor of claim 1, said determining means comprising an advance station control and jump control means operating in conjunction and responsive in accordance with results of a conditional jump operation where present in said anticipated instructions to decide and implement a decision selectively to allow processing in said final station and to prevent processing in said final station.

3. The processor of claim 1 wherein
(a) said prior processing means comprises an advance station,
(b) said processor further comprising a final station final queue,
(c) said means to prevent said advanced station from further preprocessing after completing a current instruction being responsive to look-ahead conditions of selectively conditional jump, jump on test for field, and special instruction to empty said final queue without any jump,
(d) said processor further comprising means to effect continuous advancement of said advance station after completing the current instruction in the absence of said three conditions,
(e) said means to halt said advance station comprising means operative until said final queue is empty,
(f) said processor further comprising means such that at the time said final queue is empty the location of the next address dependent upon said conditions is known.

4. The processor of claim 1,
(a) said final station comprising a final queue,
(b) said processor determining means comprising an advance station, an advance control station and jump control means conjunctively operated such that upon an unconditional jump, decoding of the jump instruction occurs and said final station is permitted to finish the necessary computations to empty said final queue,
(c) said advance station control and jump control means further comprising means responsive to a conditional jump to prevent said advance station from proceeding,
(d) said advance station comprising means to decode said conditional jump instruction to determine to what location it must go,
(e) said advance station, advance control and jump control means further comprising means whereby said advance station must hold up in the event of a conditional jump and wait for said final queue to become empty,
(f) said processor means further comprising means whereby upon the results of the conditional jump being known, said advance station executes the jump accordingly,
(g) instruction look-ahead means,
(h) means whereby where said jump is executed, said instruction look-ahead is provided with additional instructions,
(i) said last-named means comprising said jump control means and further comprising a jump control register to contain an address,
(j) said processor further comprising an instruction look-ahead register and means to transfer said jump control address to said instruction look-ahead register such that instructions to which the program is jumping may be fetched to said instruction look-ahead means,
(k) and means whereby when instructions are fetched to said instruction look-ahead means, syllable determination operation is effected to advance the instructions to said advance station.

5. The processor of claim 1, said prior processing means comprising
(a) an instruction look-ahead station comprising (1) a plurality of registers for storing instructions to be executed, (2) a plurality of pointers to control loading and unloading of said look-ahead station, (3) a look-ahead register to hold the address of instructions to be fetched to said instruction look-ahead station, (4) a program counter,
(b) a syllable determination unit comprising (1) means to hold words including the next instruction which will be requested by said advance station, (2) a barrel switch,
(c) an advance station comprising (1) an advance control means to pass instructions having to do with computation to said final station (2) an advance station instruction register, (3) an operation decoder, (4) an automatically operated jump control means, (5) an operation code decoder to decode instructions, (6) means for computing addresses,
(d) said final station comprising a final queue,
(e) said advance station control and jump control being effective upon conditional jumps which require a test of data to cause the processor to wait for said final station to compute the data which is to tested and generally to permit emptying of said final queue,
(f) said system thereby providing look-ahead wherein backing up and undoing of data manipulation is avoided,
(g) said advance station instruction register being responsive to said syllable determination unit to provide outputs for decoding in said operation decoder,
(h) said operation decoder having a first output to supply a transformed code to load said final queue and a second output to limit an area of memory which can be accessed through a particular program reference table line,
(i) said program counter pointing to the instruction in the current segment of code which is at the moment in said advance station.

6. The processor of claim 1 wherein said processor is associated with a main memory, said processor comprising
(a) means for effecting an indirect jump automatically,
(b) said automatic means comprising control mechanism means responsive to a jump control word,
(c) a test tag logic unit, included in said automatic jump effecting means, and connected to said prior processing means via a communication unit control means to apply a selected plurality of test signals to said jump control word,
(d) a jump control register, also connected to said prior processing means, to store said jump control word,
(e) an adder means included in said prior processing means to add together the contents of a plurality of storage registers,
(f) an address register connected to said adder means to receive and store the sum manufactured by said adder means,
(g) a fast-acting auxiliary reference storage means with a storage queue means connected thereto, also coupled to receive the sum produced by said adder means,
(h) a communication unit, including said communication unit control means, connected to said auxiliary reference storage means to fetch said jump control word into said auxiliary storage, (i) said communication unit comprising a communication address register to determine when to go into said main memory for a word and a communication fetch register to hold memory-obtained words for presentation to said fast-acting auxiliary reference queue, (j) said memory further comprising a program reference table portion, and (k) means to insure automatic return of information such that a return can be safely obtained under the control of an executive program to said program reference table portion, (l) whereby facilities of interleaving of program and tasks by an executive program is facilitated without program intervention.

7. The apparatus of claim 6, said means for effecting an indirect jump automatically comprising means for effecting selectively a non-return jump, an internal segment jump, an external segment jump and a procedure jump.

8. The processor of claim 1, said means to provide processing of present and anticipated instructions comprising means for effecting an indirect procedure jump comprising (a) means for decoding a jump control word, (b) control mechanism responsive to said decoded jump control word, (c) a plurality of alternate bounds registers connected to said control mechanism to provide limiting address information thereto, (d) a bounds comparator connected to said plurality of alternate bounds registers to receive and compare the alternate bounds information contained in said bounds registers, (e) means to store a program reference table connected to said control mechanism to supply thereto said reference table of information, (f) a program reference table register selectively connected between said bounds comparator and said program reference table storage means to provide reference information to said comparator, (g) a base program register also connected to said control mechanism to provide a base program address thereto, (h) means responsive to said control mechanism and to said bounds registers and said bounds comparator for decoding words representing return information in said program reference table, and (i) means connected to said responsive means to effect a jump to an area determined by said return information words comprising said program reference storage means, said program reference table register and said program register.

9. The apparatus of claim 1, said processing of present and anticipated instructions being operative in conjunction with a main memory and comprising (a) automatic means for effecting an indirect jump before execution of subsequent commands can be effected thereby permitting processing to go on and programs to be shorter, and (b) means responsive to direct jumps to enable the program execution of subsequent steps, (c) said automatic indirect jump means comprising (1) a jump control register, (2) a local fast-memory register for storing program reference table words, said main memory also storing said program reference table words, (3) a program reference table base register, (4) a base program register and (5) a program control register, (d) said jump control register comprising means for automatic assembly and without program attention, of disbursement of information from program reference table local and main storage means, said program reference table register, said base program register and said program count register, (e) said indirect jump means comprising automatic means for several classes of indirect jump comprising nonreturn jumps, internal segment jumps, external segment jumps and procedure jumps.:

10. A processor comprising a plurality of subprocessor units for dividing processor functions in parallel processing operating relationship said subprocessors comprising (a) an instruction subprocessor to provide a first functional path, (b) a data service subprocessor parallelly connected to said instruction subprocessor to provide a second parallel path, (c) said instruction subprocessor comprising (1) a syllable determination unit and (2) advance station means, (d) said data service subprocessor comprising (1) a local scratch pad memory for storing a plurality of data words, (2) a final station comprising instruction, variant and operand word storage facilities, (3) a stack means for manipulation of data within the processor, and (4) arithmetic means for performing data manipulations in accordance with said instruction variant and operand words.

11. The parallel processing processor of claim 10, wherein provided for said divided functions are divided fuctional paths and said data service subprocessor further comprises (a) means for storing data previous to use by said data service processor, (b) final station means connected to said advance station means of said instruction subprocessor comprising arithmetic means to preform arithmetic and shift operations therein, (c) a temporary storage means connected to said final station means to hold operands and variants for said arithmetic and shift processing performed therein, (d) a final queue means also connected to said final station means to hold instructions for said arithmetic and shift processing, and (e) a storage stack means also included in said final station means and connected therein for temporary data storage in conjunction with said arithmetic and shift operations.

12. The apparatus of claim 11 wherein said instruction service subprocessor comprises (a) an instruction look-ahead station, (b) a syllable determination unit, (c) and advance station, (d) said syllable determination unit being responsive to said instruction look-ahead station to feed instructions to said advance station, (e) a program count register to point to a current instruction being processed, (f) a local register to hold predetermined instructions, and (g) associative memory means comprising index and program reference table queue means to hold index words, and program reference table information and a storage queue, (h) said storage queue storing recently utilized words to provide main memory results in the computation of an address at said advance station, (i) said storage queue comprising a circular buffer for said address and for data which will be stored in that address when said final station catches up to the point to which said address in the program string corresponds, (j) said storage queue receiving data from the top of said stack when an instruction to store to memory works its way through said final queue.

13. The apparatus of claim 12, said processor further comprising a communication unit, (a) said storage queue comprising a means for storing to memory at leisure by said communication unit and avoiding interfering with other operations in going to memory, (b) said storage queue further comprising a means to prevent said advance station from trying to fetch words from memory before said final station has manufactured the words which are to be fetched by providing a storage means wherein any word which is to be stored back to memory and which has not arrived there will be recognized upon comparison of a fetch instruction address against said storage queue.

14. The apparatus of claim 11, (a) said final queue comprising a first plurality of cells to hold instructions arranged in circular buffer relationship, (b) said temporary storage comprising a second plurality of cells equal in number to said first plurality of cells for holding data words and variants which are placed in one-to-one correspondence with the cells of said final queue, (c) said final queue containing short storage bytes for instructions when required by said final queue, (d) said final station further comprising (1) a decoding matrix, (2) computation means, (3) a comparator, (4) a barrel shift register, and (5) logical networks which in conjunction with said operand stack performs data manipulation in accordance with arithmetic instructions provided in said final queue.

15. In a computer system comprising memory and data manipulation means, a processor comprising, (a) a plurality of substantially operationally independent functional stations, (b) said functional stations comprising (c) a communication unit having first connecting means coupled to said memory to provide bidirectional communication therewith, and further having second connecting means, (d) an advance station connected to said second connecting means of said communication unit, and (e) a final station connected to said second connecting means of said communication unit, and also connected to said advance station, (f) means operably associated with said advance station to detect and indicate the presence of certain conditional jump instructions therein, (g) means connected between said detecting means and said final station to prevent said final station from executing data manipulating instructions when the presence of said conditional jump instruction is indicated by said detecting means, (h) said processor comprising separate functional path means to parallelly handle differing processing functions.

16. The apparatus of claim 15, said processor further comprising (a) an instruction look-ahead unit, (b) a syllable determination unit, (c) said instruction look-ahead comprising a local memory unit for buffering instructions of a current program in advance of their use, such that the time taken in fetching program words is masked since the instruction look-ahead is sufficiently ahead of said advance station computation, (d) said advance station comprising means for address computation, (e) said syllable determination means comprising means for unpacking instructions for presentation to said advance station.

17. The apparatus of claim 16, said advance station comprising (a) a program processing portion, (b) an instruction register to hold the current operational code syllable and associated variant and address syllables, (c) an advance station control unit to determine whether and what operations are to be performed by said advance station, said operations comprising address arithmetic, (d) a plurality of base registers associated with said advance station, (e) means for checking computed addresses against memory bounds, (f) said processor further comprising an associative memory device, (g) said advance station further comprising means to determine if a requested word is stored in said associative memory device, (h) said advance station further comprising means such that where a word in said advance station is intended for said final station, said advance station transfers the word to said final station, (i) said advance station further comprising an adder to add address syllables, the contents of one of said base registers and an indexing amount, (j) an advance station address register to apply indexing to address computation, said address register being an accumulator for index arithmetic, (k) said advance station handling all instructions executed in said processor, (l) said advance station further comprising means whereby instructions which are final station operations are decoded and transferred to said final station.

18. The apparatus of claim 15, said processor further comprising (a) an associative auxiliary scratch pad memory, (b) said associative memory comprising a program reference table queue, to provide local storage for the most recent program reference table relative references to main memory and to provide local storage for control words used in program jumps, for words containing alternate memory address bounds and for words containing indirect addresses, (c) a jump control register, (d) said advance station comprising means determining execution of all program jumps and comprising (1) means associated with said program jumps initializing said jump control register, (2) providing distribution of said jump control word, and the formation of a return control word, (3) sensing all interrupt conditions, (4) responding to specific interrupt conditions, (5) controlling preliminary interrupt processing sequences, and (6) handling all instructions executed in said processor.

19. The apparatus of claim 15, said processor further comprising (a) an associative memory, (b) said associative memory comprising an address portion and a data portion, (c) said associative memory address and data portions comprising (d) an index queue and a program reference table queue portion and (e) a main storage queue portion, (f) said index queue comprising storage means enabling a substantial portion of indexing to be accomplished without reference to main memory, (g) said program reference table queue comprising local storage for indirect addresses in the program reference table, for recent program reference table line references to main memory, for control words used in program jumps, and for alternate memory address bounds words, (h) said storage queue comprising means to recognize words to be stored in main memory which have not as yet arrived in main memory.

20. The apparatus of claim 15, said processor further comprising (a) a final queue and, (b) a temporary storage unit, (c) said final queue being responsive to preprocessing of final station instructions by said advance station to store temporarily the operation code of said instructions,
(d) said temporary queue being associated with said final queue and providing temporary storage for those variant signals and locally stored operands which exist, corresponding to said operation code of said instructions in said final queue.
(e) said temporary queue further comprising means to accept operands from memory where memory operands are required,
(f) said final station further comprising decoding and control means responsive to the information in said final queue and in said temporary queue,
(g) said final station further comprising means to provide arithmetic manipulations of data in accordance with the decoded instructions and the operands and variants from said final queue and said temporary queue respectively.

21. The apparatus of claim 15, said processor comprising
(a) a processor stack extension means of variable length,
(b) means associated with said stack extension to cause its contents to vary between a lower and upper limit of words thereby acting as a shock absorber to save continuous use of communication with memory, and
(c) means connecting said stack to main memory and effecting transfer of words to and from said memory and said stack extension to selectively replenish and empty said stack extension.

22. The apparatus of claim 15, said processor further comprising a stack unit, said stack unit comprising a variable stack extension unit connnectible to main memory for replenishment and emptying of said stack extension and providing extended length to said stack unit.

23. The apparatus of claim 15, said processor further comprising
(a) a program control register,
(b) a local data buffer area, and
(c) a local register,
(d) said local data buffer and said local register being directly addressable by and having capability of executing instructions involving load register, read register, dump register and associated operations which call on multiple fetches from memory and multiple stores to memory,
(e) said local data buffer comprising a plurality of unassigned scratch pad references for programmer use and affording means to control and provide multifetch and multi-store of operands between said processor and said memory.

24. The processor of claim 15, said processor further comprising
(a) an instruction look-ahead unit,
(b) said instruction look-ahead unit comprising a plurality of registers connectably arranged in circular array to hold instructions fetched from said memory,
(c) and address register operably connected to said memory to indicate the location in said memory from which the next instruction is to be fetched to said plurality of registers,
(d) a load pointer and a read pointer both connected to said look-ahead unit to keep track of the number of instructions which are in said instruction look-ahead unit at any time.
(e) means connected between said look-ahead unit and said memory to optionally provide single and multi-word fetches from said memory to said look-ahead unit.

25. The apparatus of claim 24, said processor further comprising
(a) a syllable determination unit,
(b) said syllable determination unit comprising (1) a barrel switch to gate instruction words including the next instruction which will be requested by said advance station, (2) a syllable counter to count the number of syllables in each instruction, (3) a syllable shift counter which indicates the next syllable which has not been transferred to said read pointer in said look-ahead station.
(c) said look-ahead unload read pointer comprising means to unload one register at a time and to chase said load pointer until said read pointer gets within a predetermined number of registers of the one to which said load pointer points,
(d) said instruction look-ahead unit further comprising means to cause fetch of a plurality of words from memory, and means to increment said load pointer accordingly thereby tending to keep a gap of at least a predetermined amount of words between said load pointer and said read pointer.

26. The system of claim 15 wherein said final station comprises a final queue and computation means, said advance station comprising
(a) an instruction register,
(b) a plurality of base address registers,
(c) means to decode instructions having to do with the computation of address and the fetching of data such that the data fetches can be initiated before the computation of the data itself has to be done,
(d) means to pass instructions having to do with computation to said final queue to await execution, at said
(e) final station means comprising (1) said base registers, (2) an address register and (3) said instruction register for computing addresses in accordance with address computing instructions for passing them to said communication unit for fetching data from memory,
(f) means to effect indexing,
(g) means to process anticipated jump instructions selectively, always executing unconditional jump instructions and delaying processing in the case of certain conditional jump instructions to cause the system to wait for the final station to compute the data to be tested and to cause emptying of the final queue normally to eliminate guessing as to which way a program string will go.

27. The system of claim 15 wherein said advance and final stations comprise various units which periodically require access to main memory, said communication unit comprising
(a) means to control and execute references to main memory by said processor and
(b) means to monitor the various units within the advance station and the final station which periodically require access to main memory,
(c) said final station various units comprising a stack extension and a temporary queue,
(d) said advance station various units comprising an associative memory,
(e) said associative memory comprising (1) a storage queue, (2) an index queue and a program reference table queue, said processor further comprising a look-ahead unit,
(f) said communication unit further comprising means to service (1) said stack extension on a need basis, (2) to service said temporary queue on a demand basis in accordance with initiation of requests for service to the temporary queue made by said advance station, (3) to service said instruction look-ahead unit on a need basis in one way relationship whereby instructions are fetched from memory to store in the look-ahead unit, and (4) to service said storage queue on a need basis, to service said index queue and program reference table queue on both demand and need bases, (g) said communication unit further comprising means (1) to monitor said stack extension and automatically execute store and fetch operations selectively in order to maintain a predetermined number of operands for use by said final station, (2) to monitor said storage queue continuously and periodically store data from said storage queue to main memory in order to keep said data available for use by said final station, (h) said communication unit further comprising (1) means to place in said associative memory any fetch reference made to main memory by the central processor that is relative to a base index register or the program reference table, (2) means to remove the oldest piece of data in said index queue and program reference table queue of associative memory when full, (3) means to generate parity on outgoing addresses and data and to check parity on incoming data, and (4) means to provide monitoring of interrupt lines.

28. The system of claim 15, said communication unit comprising (a) receivers to receive and standardize signals to said processor from said memory, (b) transmitters for interunit communication to supply power drive to signal lines, (c) a communication address register for address buffering, (d) a communication store register for buffering of write data, (e) a communication fetch register to act as a distribution center for incoming data, (f) and a communication control unit to provide service monitoring, priority and conflict resolution and the control of processor to memory operations.

29. The system of claim 15 wherein said final station comprises means to perform arithmetic and logical operations and stack test operations, (a) a stack which comprises (1) a stack extension, (2) a top of stack register, (3) a second register, (b) a final queue to hold instructions, (c) a temporary storage unit in one-to-one correspondence with said final queue to hold variants and data as required by said instructions.

(d) a comparator for stack and field testing and logical functions, (e) means for normalization and conversion from integer to floating point format, and for stack and field testing against zero, (f) adder and multiplier means for arithmetic operation, (g) a high-speed barrel shift mechanism for providing shifts and field manipulation, (h) said final station being under control of said advance station but being impervious to being stopped as long as there are instructions in said final queue, (i) means to accomplish all data stores to main memory from the top of said stack, (j) said advance station comprising an associative memory comprising a storage queue, (k) means to transfer the contents of said top of stack register to the storage queue on command to store stack to memory, (l) said final station being independent of said advance station to operate except that said final station requires at least one piece of information in said final queue and if corresponding information is required in said temporary storage unit in order to continue operation.

30. In a processor, means to provide dynamically varying alternate memory bounds under control of, but without intervention by, an executive program said means comprising, (a) an upper alternate bounds register to store an upper number limit memory address, (b) a lower alternate bounds register to store a lower number limit memory address, (c) a station address register to store the memory address of information being sought by a preprocessing station within said processor, (d) a bounds comparator commonly connected to said upper alternate bounds register, said lower alternate bounds and said station address register, (e) a source of tag bits and a logical unit, comprising a plurality of input gates, said gates connected to said tag bit source and said alternate bounds registers and responsive to said tag bits, (f) said tag bits being independent of any object program, effective to control the filling of the alternate bounds registers, and responsive only to an executive program to thereby make said alternate bounds settings flexible without program intervention.

31. The means of claim 30 wherein the object programs selectively call for no alternate bounds involved and alternate bounds involved, where alternate bounds are involved said object program calling for a look at said tag bits, said tag bits determining whether a change of alternate bounds is in order, said means further comprising (a) a program reference table register, (b) a program reference table queue, (c) means to determine whether said address in said station address register as modified is stored in said program reference table queue and to determine whether the tag bits require change of the alternate bounds, (d) means responsive where alternate bounds change is required as determined by said tag bits (1) to place a first plurality of said bits from said program reference table queue into said alternate bounds lower register, (2) to place a second plurality of bits from said program reference table queue into said upper alternate bounds register, (e) a station adder unit to form a word by adding (1) the said program table queue bits which were placed in said alternate bounds lower register, (2) the said program reference table queue bits which were placed into said upper alternate bounds register, (3) predetermined bits remaining in said program reference table queue, (f) means to insert into said station address register said word formed by adding as the new index word such that said new index word is between the alternate bound settings provided by a change in alternate bounds.

32. The processor of claim 30 said processor further comprising (a) an upper normal bounds register to store an upper limit memory address, (b) a lower normal bounds register operatively associated with said upper normal bounds register to store a lower limit memory address.

(c) a data base register to store the base memory address, and (d) a base index register to store an indexing constant, said base index register being coupled for selective addition to said data base register, (e) said upper and lower normal bounds registers further comprising means for setting the limits for direct memory access to any given object program, (f) said lower normal bounds register connected to said data base register to receive the contents included in the first word in said data base register, (g) said alternate bounds registers further comprising the means required to set any access beyond the normal bounds limits, (h) said processor still further comprising (i) a program reference table base register, (j) a program reference table limit register, and (k) comparing means associated with and coupled to said last named program reference table base register and program table limit register to compare the number of memory requests to a program reference table against the size of the program reference table to determine whether the memory requests are to a portion within the program reference table valid area,
(l) further means coupled between said program reference table and said alternate bounds registers to tag as alternate bounds a word which has been fetched from said valid area comprising
(m) means to insert a predetermined portion of said word so fetched into said station address register for use by the next address manufactured by said station address register, and
(n) means coupled to said alternate memory bounds registers to insert an additional portion displaced from said first word portion into one of said alternate memory bounds registers to limit the area of memory which can be accessed through this program reference table line.

33. In a system with hard circuit logical means and information sources comprising a main memory and a processor,
(a) a plurality of auxiliary scratch pad memory means included in said processor comprising relatively small, uniform access memory devices, with access and cycle times compatible with that of the hard circuit logic of the system said scratch pad memory means being closely coupled selectively between at least one source of information to be stored and one destination for said stored information to be sent,
(b) said auxiliary scratch pad memory devices further comprising means including associated controls to perform different functions parallely,
(c) said plurality of scratch pad memory devices including at least an auxiliary instruction processor look-ahead memory, a local data buffering memory, a temporary queueing memory and an auxiliary stack memory.

34. The system of claim 33,
(a) said look-ahead means being operative as a circular buffer to buffer multi-byte fetch and multi-byte store of information and further comprising
(b) an address register which controls the location in memory from which the next instruction is to be fetched,
(c) a load and a read pointer which keep track of the number of instructions which are in said instruction look-ahead at any time,
(d) said read pointer incrementing by one every time a word is unloaded from said instruction look-ahead scratch pad memory,
(e) the area behind said load pointer and ahead of said read pointer containing valid instructions and the area behind said unload pointer around to the next load pointer comprising used instructions,
(f) said load pointer comprising a recycling counter to increment by one a number of times corresponding to the bytes fetched every time an additional number of bytes are fetched from memory, and which counts initially from zero to the last register in said look-ahead and continues recycling in the absence of a jump instruction from the look-ahead register containing the byte after the bytes involved in a single fetch to said look-ahead last register continuously, and in the case of a jump instruction recycling to said first register of said look-ahead means,
(g) said look-ahead means further comprising an instruction look-ahead register counter capable of fetching a plurality of bytes at a time from memory into said look-ahead means.

35. The processor of claim 33,
(a) said processor further comprising an associative memory,
(b) said associative memory comprising means to short circuit fetching processes to memory and to enable rapid selection of scratch pad memories,
(c) said associative memory comprising an address section and a data section and being functionally divided into an index area, a program reference table indirect address area and a main storage area,
(d) said associative memory index queue and program reference table queue area being operated as a circular buffer and further comprising means wherein when a memory reference is made to a program reference table line or to an index word which is not held in said associative memory, the oldest such line or word is ousted from the associative memory and the one newly referred to is inserted at what had been the oldest location,
(e) said storage queue comprising means to store an address computed within said processor and
(f) said storage queue further comprising a circular buffer for storing address from an advance section of said processor and for storing data from a final station of said processor when said final station catches up to the point with which said address is concerned,
(g) said storage queue thereby providing means such that the operation of storing to memory can be done at leisure without interfering with other operations involved in going to memory and further preventing an advance station from trying to fetch words from main memory before the final station has manufactured the words which are to be fetched.

36. The processor of claim 33 and including an advance and final processing means comprising
(a) a final queue which comprises registers in circular buffer arrangement to hold short storage instructions,
(b) a FINQ-TEMP load pointer to mark the point at which siad advance processing means will insert instructions which have not as yet been executed after passing through said advance processing means, and which are to be finished by a final processing means.
(c) a FINQ-TEMP read pointer to mark the end of said final queue and to represent the places where the instructions are transferred to said final processing means for completion of execution,
(d) said temporary storage means comprising full data word cells for holding data words in one-to-one correspondence with the words in said final queue,
(e) said temporary storage containing words comprising operands and variants for operation by said final processing means in conjunction with said final queue contained instructions.

37. The scratch pad memory means of claim 33 wherein
(a) said operand stack comprises a last-in, first-out operand stack operative with Polish, parenthesis free, notation,
(b) said stack comprising means for accessing stack words back into memory under hardware control to secure substantially unlimited length of stack,
(c) said stack comprising a plurality of registers for containing operands and a stack extension area,
(d) said registers comprising the words on top of the stack and being separated from said stack extension,
(e) a top pointer to indicate the top word in the stack extension which is stored,
(f) a bottom pointer for the stack extension to point to the bottom word of the stack extension,
(g) a differencer to detect differences between the ordinal positions of the words to which said top pointer and said bottom pointer are pointed,
(h) means to transfer a bottom multiple of words back to memory at the location indicated by said stack location pointer when said bottom and top pointers are at maximum spread of the stack extension, (i) means to provide additional addresses in said stack extension when said bottom pointer and top pointer come closer together than a predetermined amount, (j) a stack location pointer to indicate an area of memory assigned to said stack extension, (k) said stack extension thereby comprising a variable length section within said processor to provide for saving of accesses to memory, (l) and means whereby said stack may comprise greater depth by including means for extension into main memory.

38. The system of claim 33, said plurality of scratch pad memories further comprising (a) a scratch pad memory device comprising locally used registers and counters for storing where frequent access by the program or the hardware is not required but which must be readily available within a clock cycle when addressed, (b) said temporary queue comprising means to store literals and portions of multi-syllable instructions from their detection at an advance station until required at a final station, (c) said stack auxiliary memory further comprising a variable length stack extension portion accessible for replenishment from and emptying into memory and comprising also a pair of special registers for use in connection with arithmetic operations, (d) said local data buffer comprising means for manipulation of data between a processor and memory in multi-fetch operations, (e) said instruction look-ahead scratch pad comprising means to store multi-fetches of instruction words in advance of use in an instruction processing section of said processor, (f) an associative memory comprising a program reference and index words section and a storage queue section, (g) said program reference table and index words section comprising copies of program reference table lines in main memory and index words stored interchangeably, (h) said storage queue comprising means for storing words destined for memory and their absolute address to save time and insure that the newest data is fetched to said processor, and (i) a short word storage device for storing instructions between an advance station and a final station.

39. A processor to operate in conjunction with a main memory comprising (a) means to provide parallel processing comprising a plurality of means to provide a plurality of differing functional paths, (b) look-ahead means connectably included in one of said plurality of path means to prevent processing of commands by said processor where a future command is to call for an operation which would render such processing undesirable, (c) means connectably included in another of said plurality of functional path means to provide flexible dynamic memory bounds for executive control instruction groups being coupled along said functional path means, (d) a plurality of functionally separate processor auxiliary scratch pad memories and controls respectively connected in each of said plurality of functional paths to provide intermediate storage and buffering capability to each of said plurality of functional path means, (e) at least one of said functional scratch pad memories further comprising a variable local length stack extension means incorporating means to extend into said main memory, and (f) means connected to said look-ahead means for effecting indirect jumps automatically to thereby provide a parallel path processor capable of concurrently processing a plurality of program segments with the additional capability of bypassing program segments which later become unnecessary.

References Cited

UNITED STATES PATENTS

| | | | |
|---|---|---|---|
| 3,319,226 | 5/1967 | Mott et al. | 340—172.5 |
| 3,287,703 | 11/1966 | Slotnick | 340—172.5 |
| 3,287,702 | 11/1966 | Borck, et al. | 340—172.5 |
| 3,323,109 | 5/1967 | Hecht et al. | 340—172.5 |
| 3,229,260 | 1/1966 | Falkoff | 340—172.5 |
| 3,223,976 | 12/1965 | Abbott et al. | 340—147 |
| 3,242,465 | 3/1966 | Gloates et al. | 340—172.5 |
| 3,158,844 | 11/1964 | Bowdle | 340—174.1 |
| 3,156,897 | 11/1964 | Bahnsen et al. | 340—172.5 |
| Re. 26,171 | 3/1967 | Falkoff | 340—172.5 |

PAUL J. HENON, *Primary Examiner.*

GARETH D. SHAW, *Examiner.*